US011972033B2

(12) United States Patent
Johnson et al.

(10) Patent No.: US 11,972,033 B2
(45) Date of Patent: Apr. 30, 2024

(54) ALERT HANDLING

(71) Applicant: Google LLC, Mountain View, CA (US)

(72) Inventors: Scott D. Johnson, Cupertino, CA (US); Timothy Jay Chen, Pleasanton, CA (US); Christopher Gori, San Francisco, CA (US); Eunchan Kim, San Jose, CA (US); Michael Stefano Fritz Schaffner, Campbell, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/633,530

(22) PCT Filed: Oct. 31, 2020

(86) PCT No.: PCT/US2020/058444
§ 371 (c)(1),
(2) Date: Feb. 7, 2022

(87) PCT Pub. No.: WO2021/087417
PCT Pub. Date: May 6, 2021

(65) Prior Publication Data
US 2022/0292228 A1 Sep. 15, 2022

Related U.S. Application Data

(60) Provisional application No. 62/929,514, filed on Nov. 1, 2019.

(51) Int. Cl.
G06F 21/76 (2013.01)
G06F 21/60 (2013.01)
G06F 21/85 (2013.01)
(52) U.S. Cl.
CPC ............ G06F 21/76 (2013.01); G06F 21/602 (2013.01); G06F 21/85 (2013.01)

(58) Field of Classification Search
CPC ...................................................... G06F 21/85
See application file for complete search history.

(56) References Cited

U.S. PATENT DOCUMENTS 6,286,066 B1    9/2001  Hayes et al.
8,123,133 B2 *  2/2012  Dubois ................... G06F 21/87
                                                    235/492

(Continued)

FOREIGN PATENT DOCUMENTS

WO    2021087417    5/2021
WO    2021087418    5/2021

OTHER PUBLICATIONS

"Intel Atom Processor C2000 Product Family for Microserver", Datasheet, Jan. 2016, 745 pages.

(Continued)

Primary Examiner — Viral S Lakhia
(74) Attorney, Agent, or Firm — Colby Nipper PLLC

(57) ABSTRACT

An IC chip can provide silicon root of trust (RoT) functionality. In described implementations, the IC chip includes a processor, an alert handler, and multiple peripheral devices, which generate alert indications. The alert handler processes the alert indications, which have security implications. The alert handler includes multiple alert receiver modules to communicate with the multiple peripheral devices. The alert handler also includes a controller, multiple accumulation units, multiple escalation timers, and multiple escalation sender modules. These components can be organized into a hierarchy of increasing escalation severity. In operation, the controller classifies an alert and flexibly implements an adaptable alert handler path that is established through the escalation components responsive to the classification and based on a source of the alert. A path can conclude with an escalation sender module commanding an escalation handler (Continued)

to implement a security countermeasure. The flexible paths can therefore handle different types of alerts.

20 Claims, 11 Drawing Sheets

(56) References Cited

U.S. PATENT DOCUMENTS

| | | | |
|---|---|---|---|
| 9,792,446 B2 * | 10/2017 | Chan | G06F 21/60 |
| 9,946,899 B1 | 4/2018 | Wesson et al. | |
| 10,747,908 B2 * | 8/2020 | Martel | G06F 21/81 |
| 10,824,725 B2 * | 11/2020 | Venkataramani | G06F 12/1491 |
| 11,087,610 B2 * | 8/2021 | Anderholm | G06V 20/40 |
| 11,475,169 B2 * | 10/2022 | Foltin | H04L 67/56 |
| 11,477,219 B2 * | 10/2022 | Jenkinson | H04L 63/1433 |
| 11,574,048 B2 * | 2/2023 | Ho | G06F 21/85 |
| 2003/0115503 A1 | 6/2003 | Lehman et al. | |
| 2009/0037747 A1 | 2/2009 | Xie | |
| 2009/0327429 A1 | 12/2009 | Hughes et al. | |
| 2014/0229644 A1 | 8/2014 | Thanigasalam et al. | |
| 2016/0378996 A1 | 12/2016 | Smith et al. | |
| 2017/0126472 A1 * | 5/2017 | Margalit | H04L 41/065 |
| 2017/0249099 A1 | 8/2017 | Jun et al. | |
| 2018/0034793 A1 * | 2/2018 | Kibalo | G06F 21/575 |
| 2019/0026478 A1 | 1/2019 | Wu et al. | |
| 2019/0088096 A1 * | 3/2019 | King | G08B 13/19665 |
| 2019/0172047 A1 | 6/2019 | Tan et al. | |
| 2019/0180041 A1 | 6/2019 | Bhunia et al. | |
| 2019/0327486 A1 | 10/2019 | Liao et al. | |
| 2020/0310662 A1 * | 10/2020 | Staab | G06F 21/44 |
| 2021/0124711 A1 * | 4/2021 | Ansari | G06F 11/0772 |
| 2021/0312092 A1 | 10/2021 | Belgarric et al. | |
| 2022/0292226 A1 * | 9/2022 | Johnson | G06F 21/602 |

OTHER PUBLICATIONS

"International Search Report and Written Opinion", Application No. PCT/US2020/058445, dated Feb. 16, 2021, 10 pages.

"International Search Report and Written Opinion", Application No. PCT/US2020/058444, dated Feb. 16, 2021, 11 pages.

Sukhomlinov, et al., "Mitigating Malicious Firmware by Detecting the Removal of a Storage Device", Technical Disclosure Commons; Retrieved from https://www.tdcommons.org/dpubs_series/2378, Aug. 2, 2019, 10 pages.

"International Preliminary Report on Patentability", Application No. PCT/US2020/058444, dated May 3, 2022, 7 pages.

"International Preliminary Report on Patentability", Application No. PCT/US2020/058445, dated May 3, 2022, 7 pages.

Pursuant to MPEP § 2001.6(b) the applicant brings the following co-pending application to the Examiner's attention: U.S. Appl. No. 17/633,541.

"Foreign Office Action", CN Application No. 202080020058.6, Sep. 29, 2023, 25 pages.

"Non-Final Office Action", U.S. Appl. No. 17/633,541, Mar. 1, 2024, 22 pages.

* cited by examiner

ALERT HANDLING

CROSS-REFERENCE TO RELATED APPLICATION(S)

This application is a national stage entry of International Application No. PCT/US2020/058444, filed 31 Oct. 2020, which claims the benefit of U.S. Provisional Application No. 62/929,514, filed 1 Nov. 2019, the disclosures of which are incorporated herein by reference in their entirety.

BACKGROUND

Electronic devices play integral roles in manufacturing, communication, transportation, healthcare, commerce, social interaction, and entertainment. For example, electronic devices power the server farms that provide cloud-based, distributed computing functionality for commerce and communication. Electronic devices are also embedded in many different types of modern equipment, from medical devices to appliances and from vehicles to industrial tools. Personal electronic devices enable portable video viewing and access to smart digital assistants. Additionally, one versatile electronic device—the smartphone—has practically become a necessity to have within arm's reach. With electronic devices becoming pervasive and crucial to many aspects of modern life, device security has become imperative.

Many people are familiar with malware, which is sometimes referred to generically as a "computer virus." Some malware is designed to gain unauthorized access to information stored on an electronic device or to otherwise compromise the electronic device. Several strategies can help keep a user's information and devices safe from security threats by countering many types of malware. These strategies include employing and regularly updating a resilient operating system, engaging in safe computing practices, and installing an antimalware program. Unfortunately, these strategies cannot make an electronic device invulnerable to malware attacks.

Further, electronic devices can also be vulnerable to other types of attacks besides those carried out by software-based malware. The safe and reliable operation of electronic devices, as well as the security of information stored by such devices, can be jeopardized by physical attacks on hardware and by radio-frequency attacks against wireless communications. In other words, some forms of attack can circumvent or undermine the strategies listed above to enable a bad actor to compromise an electronic device and perhaps gain access to any accounts that are used with the device.

Generally, an electronic device includes at least one integrated circuit (IC) that provides intelligence to enable some desired functionality. The functionality may be critical to facilitating commerce, providing healthcare services, or enabling one of the other services identified above. Such an electronic device may also store or otherwise utilize information that is to be safeguarded. To support these functionalities and facilitate safe operation, some electronic devices include hardware-based protection in the form of security circuitry. Unfortunately, existing security circuitry is unable to combat the varied software, hardware, and wireless attacks that are being unleashed on electronic devices today.

SUMMARY

Certain electronic devices, like server computers and smartphones, are responsible for providing services to users. The users rely on such electronic devices to provide critical services that are accessed using one or more accounts, like for banking or air travel. Because of the linkages between electronic devices and accounts, a compromised electronic device may permit undesired access to the services linked to an account or directly to the account itself. Further, to provide services that are associated with accounts, these electronic devices may store account information that is to be safeguarded, such as financial data, usernames, passwords, and secret keys for encryption. Unfortunately, antimalware programs cannot block all avenues of attack against an electronic device. For instance, an antimalware program may not provide protection against a direct physical attack that uses miniature probes to detect voltage levels on an integrated circuit (IC) chip. Consequently, it is beneficial to incorporate into an electronic device hardware-based measures that can identify, block, repel, or otherwise thwart attacks on the electronic device, including physical attacks.

An electronic device may therefore include security circuitry to counter attacks from bad actors. In some cases, the security circuitry detects inappropriate or suspicious activity and takes protective action. The security circuitry can be implemented in different manners. For example, computer engineers can realize security circuitry as a standalone IC chip or as part of another chip, such as a system-on-chip (SoC). In either case, the security circuitry can be part of a protected enclave, a trusted chip platform, a hardware-based root of trust (RoT) (e.g., silicon RoT), and so forth. Regardless of how or where the security circuitry is incorporated into an electronic device, computer engineers may design security circuitry to counter many different types of attacks.

Attacks on electronic devices can take the form of programs, such as malware, that observe repetitive behavior to infer information, programs that attempt to read data from protected areas of memory, direct physical probing of hardware circuitry, and so forth. Security circuitry performs multiple functions to combat these attacks. For example, security circuitry can protect encryption keys during use and while in transit. To do so, dedicated memory and private data buses can be employed. Security circuitry can also generate high-quality pseudorandom numbers or operate a cryptographic engine in an area that is separate from applications that may be operating as malware. Further, security circuitry may ensure that hardware is booted using the correct, untampered boot basic input/output system (BIOS). Security circuitry can therefore be responsible for implementing a diverse suite of functions to combat a wide variety of attacks on electronic devices. Existing approaches to security circuitry, however, employ relatively rigid and inflexible hardware architectures.

In contrast, this document describes approaches that provide an adaptable and flexible platform or framework that can produce resilient and programmable security hardware to combat various forms of attacks on electronic devices. In some implementations for security circuitry, different types of circuits communicate using an expansive protocol that enables circuits that provide different functions to interact seamlessly in accordance with a design framework. The design framework and protocol produce comportable components such that even circuit components that are designed separately from one another are suitable to be consistently deployed together with stable, predictable interactions. For example, communications and other forms of interactions (e.g., sharing resources such as buses, interfaces, or memory) can be at least partially standardized to provide a measure of predictability and interoperability. As used herein, "comportable components" include those components that are consistently designed such that the components are suitable to be used together.

In some implementations for security circuitry, an alert handler interacts with peripheral devices and/or escalation handlers to produce, share, process, and/or respond to security alerts. The alert handler can be built as a comportable component. The security alerts can include those that are communicated between different circuit components that are realized as peripheral devices on a chip. The alert handler can be implemented as part of a silicon root-of-trust (RoT) chip, as a portion of a system-on-a-chip (SoC), or both. In example operations, the alert handler receives an alert indication from a peripheral device, which may be generated in response to sensed suspicious activity. A controller and other parts of the alert handler process the alert indication using a flexible scheme that can be tailored based on the source of the peripheral device or the likely seriousness of the security threat.

Generally, alerts are deemed more important or more concerning than mere interrupts. In other words, security risks that should not be ignored in a RoT or other secure silicon environment may be designated as alerts instead of only a default processor interrupt. Nonetheless, a system can still attempt to leverage the intelligence and resources of the processor to address a potential security event. To do so, in response to receiving an alert indication from a peripheral device, the alert handler can send an interrupt (e.g., a non-maskable interrupt (NMI)) to a processor to give the processor an opportunity to address the security event. If the processor fails to address the interrupt, then the alert handler takes remedial action, including possibly directing activation of a security countermeasure.

In example implementations, the alert handler includes one or more alert receiver modules that are coupled to at least one alert sender module of a peripheral device. If the alert receiver module receives an alert indication from the alert sender module, the alert receiver module provides a triggered alert to the controller of the alert handler. The controller classifies the triggered alert into one of multiple classes based on the alert receiver module, which corresponds to the peripheral device or a detected potential security threat. Based on the classification, the controller can transmit an interrupt to a processor as described above. The controller also initiates an escalation timer based on the classification of the nature of the triggered alert. Upon expiration of the escalation timer, if the processor has not cleared the interrupt, the alert handler can initiate another escalation timer to escalate the timing process along a hierarchy of escalation timers that are ordered in accordance with increasing severity of the potential security threat.

The alert handler also includes one or more escalation sender modules that are coupled to at least one escalation receiver module of an escalation handler. The escalation handler can implement a security countermeasure, including erasing data, resetting digital circuitry, or transitioning the device to an invalid life cycle state. After the expiration of one or more escalation timers, the alert handler directs the escalation sender module to send an escalate command to the escalation handler to implement the security countermeasure. The flexible scheme enables the alert handler to tailor alert processing and escalation responses in various manners. These manners include, for example, a length of each escalation timer, an order or length of traversing at least a portion of the hierarchy of escalation timers, a determination of which escalation sender module is activated first, and so forth. The tailoring can be established, at least partially, using one or more registers.

The security circuitry can include other components and features. For example, the alert handler can include a ping monitor that monitors the health of peripheral devices and/or escalation handlers using ping messages that function like bidirectional heartbeat signaling. Signaling pathways between modules in the alert handler and those in peripheral devices and/or escalation handlers can be implemented with differential paths to promote resiliency. Further, the alert handler can include integrity fail circuitry that checks the signaling pathways for correct differential functionality. To make the transmission of alert indications more robust, the same wires may be used for alert indications and ping messaging. The alert handler can also include an accumulation unit. The alert handler escalates a response process based on some quantity of triggered alerts that are tracked using the accumulation unit.

In these manners, security circuitry can be incorporated into a silicon RoT chip and/or an SoC. The security circuitry can include an alert handler that is comportable with other components to ensure expected compatibility and consistent communications. The alert handler can provide a flexible scheme for addressing potential security alerts that are generated by diverse components, which are referred to herein as peripheral devices, as alert indications due to a variety of sensed stimuli. The alert handler escalates an alert indication in multiple ways at least partially in dependence on the source or cause of the alert indication. A remedial response can be tailored as part of the escalation process to ultimately include at least one security countermeasure. Thus, an adaptable security response can be implemented in a trusted manner to provide secure functionality.

Aspects described below include an integrated circuit for alert handling. The integrated circuit includes multiple peripheral devices and an alert handler. The alert handler includes multiple alert receiver modules and multiple escalation timers. Each alert receiver module is coupled to a peripheral device of the multiple peripheral devices. Each respective escalation timer corresponds to a respective escalation severity of multiple escalation severities. The alert handler also includes a controller coupled to the multiple alert receiver modules and the multiple escalation timers. The controller is configured to classify a triggered alert received from an alert receiver module of the multiple alert receiver modules into an alert classification of multiple alert classifications based on the alert receiver module. The controller is also configured to initiate an escalation timer of the multiple escalation timers based on the alert classification.

Aspects described below include a method for alert handling that can be performed by at least part of an integrated circuit. The method includes monitoring multiple peripheral devices with multiple alert receiver modules. The method also includes receiving a triggered alert from an alert receiver module of the multiple alert receiver modules based on a peripheral device of the multiple peripheral devices. The method additionally includes classifying the triggered alert into an alert classification of multiple alert classifications based on the alert receiver module. The method further includes initiating an escalation timer of multiple escalation timers based on the alert classification, with each respective escalation timer corresponding to a respective escalation severity of multiple escalation severities.

Aspects described below include an integrated circuit for alert handling. The integrated circuit includes multiple escalation handlers and an alert handler. Each escalation handler is configured to implement at least one security countermeasure. The alert handler includes multiple escalation sender modules and multiple escalation timers. Each escalation sender module is coupled to an escalation handler of the multiple escalation handlers. Each respective escalation timer corresponds to a respective escalation severity of multiple escalation severities, with each escalation timer coupled to at least one escalation sender module of the multiple escalation sender modules. The alert handler also includes a controller coupled to the multiple escalation timers. The controller is configured to initiate an escalation timer of the multiple escalation timers responsive to a triggered alert. Responsive to expiration of the initiated escalation timer and based on the triggered alert, the alert handler is configured to selectively initiate another escalation timer of the multiple escalation timers or transmit an escalate command from an escalation sender module of the multiple escalation sender modules to an escalation handler of the multiple escalation handlers.

BRIEF DESCRIPTION OF THE DRAWINGS

Apparatuses of and techniques for alert handling are described with reference to the following drawings. The same numbers are used throughout the drawings to reference like features and components.

FIG. 4-1 illustrates additional example aspects of an alert handler that is coupled to multiple peripheral devices and multiple escalation handlers.

FIG. 4-2 illustrates additional example aspects of an alert handler relating to hierarchical levels of escalation severity.

FIGS. 5-1 to 5-3 illustrate example alert handling paths within an alert handler.

DETAILED DESCRIPTION

Overview

Figure 1:
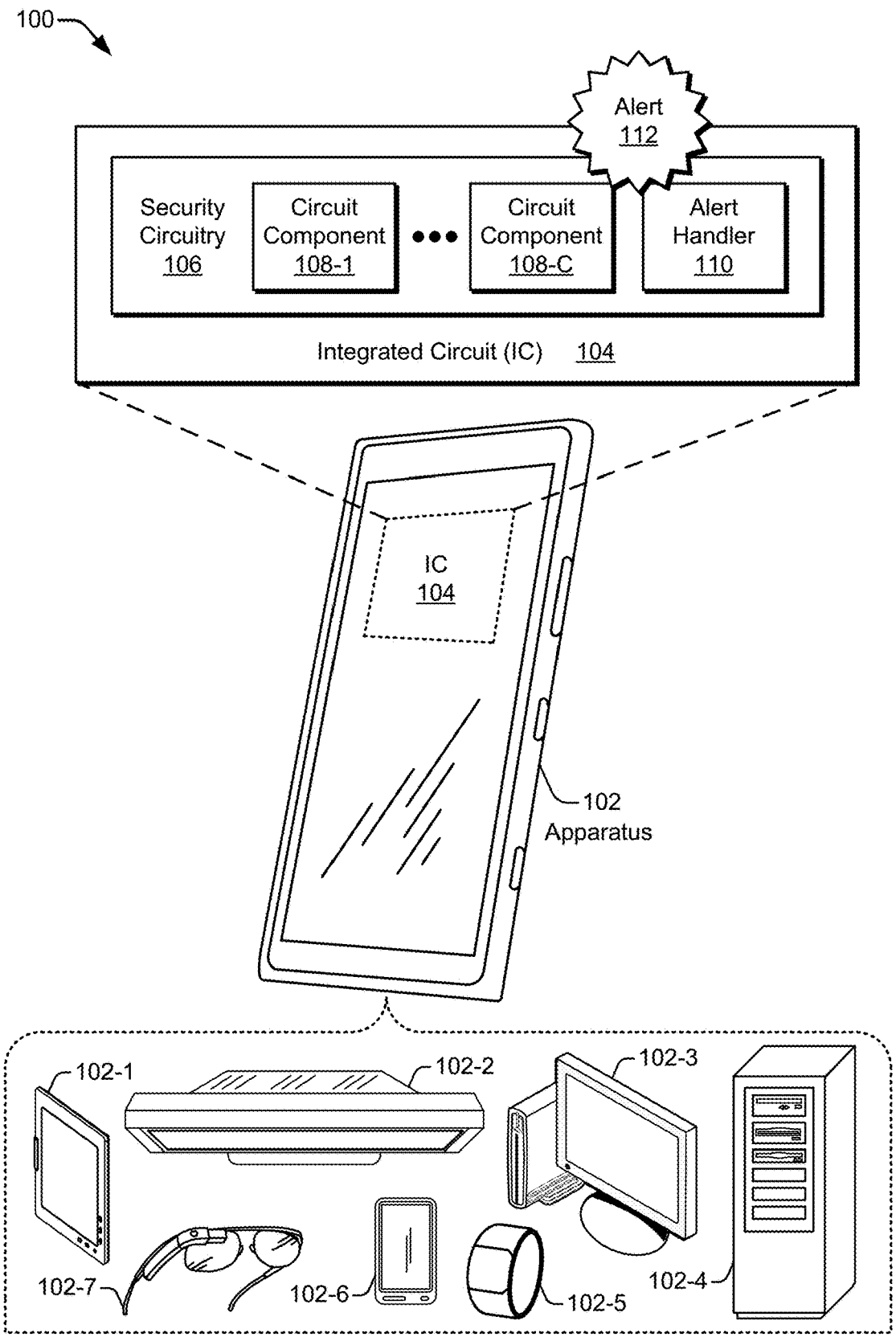
FIG. 1 illustrates an example apparatus with an integrated circuit (IC) that includes security circuitry to implement alert handling as described herein.

Electronic devices make crucial contributions to modern society, such as those for communication, safety, and manufacturing. Each electronic device relies on an integrated circuit (IC) that has processing capabilities to provide some functionality. With the critical nature of so many of these functionalities, an electronic device may include an IC with security circuitry to provide a measure of protection. The security circuitry reduces the chances that information is inadvertently exposed or that some function is used in a harmful or another unauthorized manner. Security circuitry can be realized in a multitude of forms, one of which involves the root of trust (RoT) paradigm.

With RoT silicon, a hardware-based mechanism keeps computing safe in terms of preventing inappropriate access to information, deterring unauthorized use of a device, and so forth. Silicon RoT principles can help ensure that hardware infrastructure and the software that executes thereon both remain in their intended, trustworthy state. To do so, the silicon RoT can verify that critical system components boot securely using authorized and verifiable code. Silicon RoT can provide additional or alternative security benefits. For example, it can ensure that a server or other electronic device boots with the correct firmware and that the firmware has not been infected by low-level malware. Silicon RoT can also provide a cryptographically unique machine identity; this unique identity enables an operator to verify that an electronic device is legitimate. Further, it can maintain encryption keys and other information in a tamper-resistant silo, which prevents even those with physical access from obtaining the information. RoT services that are anchored in hardware can also offer authoritative, tamper-evident audit records and other runtime security services.

Chip designers can incorporate silicon RoT technology into separate IC chips that focus on providing security functions. Alternatively, RoT silicon can be integrated with other circuitry, including in a central processing unit (CPU) chip or package, in a graphics processing unit (GPU) chip or card, in a system-on-a-chip (SoC), in a memory storage device, and so forth. Generally, security circuitry can operate in server motherboards, network cards, client devices (e.g., laptops and smartphones), consumer routers, and internet-of-things (IoT) devices, just to name a few examples. Regardless of application or electronic device, by anchoring the RoT in silicon, security is enhanced across hardware, firmware, and software levels. Silicon RoT also enhances security over different devices that are in communication with each other directly or using a network. Although some security and circuit design principles are described in this document using a silicon or hardware RoT environment, this is done by way of example only, for the described principles are applicable to security circuitry generally, including security circuitry that supports a specialized circuit like a graphics or artificial intelligence (AI) processor, security circuitry that is incorporated into a general processor or an SoC, and discrete security circuitry.

In today's computing environment, bad actors can attack electronic devices at a myriad of levels using a multitude of attack vectors. For example, an attack can be made using malware that is transmitted over the interne to attempt to obtain information that is stored in a laptop but that a user wishes to be safeguarded. Also, an attack may involve injecting malware into firmware that is used to boot an electronic device, such as a Wi-Fi® router or an IoT device, during transportation of the device or while it operates in an unobserved location. As another example, a bad actor may steal an electronic device and have ample time to perpetrate direct physical attacks on the device. Such physical attacks can include severing wires, probing voltages, repeatedly running code to observe trends and infer information, and so forth.

Thus, the types and avenues of attacks on electronic devices can be many and varied. Nonetheless, some existing RoT approaches rely on relatively simple or straightforward processing paradigms. These paradigms may lack, for example, clear and flexible protocols to enable different circuit components of security circuitry to communicate with each other. Such communication can facilitate detection of security threats and the effective thwarting of an actual security attack. With poor inter-component communication, another avenue of attack is effectively created for would-be bad actors. These inadequate paradigms may also involve fixed and inflexible process flows for dealing with alerts that are generated due to a potential attack or other suspicious activity that has been detected. If a fixed process flow is too aggressive, the security circuitry may terminate operations of a circuit component, chip, or even a whole device for a security threat that is actually minor or even a false alarm. On the other hand, if a fixed process flow is insufficiently aggressive, the security circuitry may not initiate a shutdown of a chip or circuit component thereof before an actual security threat has caused damage, such as unauthorized access to an account or theft of valuable information.

In contrast, this document describes security circuitry approaches that are flexible and adaptive. For example, with respect to process flows, or alert handling paths, an alert handler can institute process flows of differing lengths and aggressiveness. Each alert handling path can be selected responsive to a likely severity of an alert. For alerts that correspond to a likely minor threat or possibly a false positive, the alert handler institutes a process flow that includes longer or more escalation timers or starts with a less invasive or less permanent security countermeasure response. For alerts that are deemed potentially severe, on the other hand, the alert handler institutes a process flow that escalates relatively rapidly. Fewer, or even one or zero, escalation timers can be used with shorter durations for severe security threats. Additionally or alternatively, the alert handler can trigger a countermeasure response with a relatively more severe repercussion, such as erasing information or resetting an IC chip. By tailoring responses to detected security alerts, described alert handler implementations can combat various types and avenues of attacks while reducing the chances that a response is too aggressive or too slow to counter an attack.

This document also describes other aspects and implementations for alert handling. Each of these aspects and implementations may be used individually or in any combination. For a given architecture of security circuitry, security concerns may be considered more threatening or a higher priority than other issues. These other issues may be communicated across the architecture as an interrupt. Compared to interrupts, which may occur frequently or pertain to a variety of events, security-related events and thus the alerts that announce them are expected to occur less frequently. In some cases, an alert handler, in response to an alert indication, sends an interrupt to a processor in accordance with a selected alert handling path. The processor is expected to respond to the interrupt appropriately and communicate this to the alert handler. If the processor fails to clear the interrupt with the alert handler within some time period, or if the alert indication is continuing to be generated, the alert handler then escalates the alert processing with one or more escalation timers or by taking some action.

In some implementations, the alert handler includes at least one controller, multiple escalation timers, and multiple escalation sender modules. The controller determines an alert handling path for processing a given security alert using at least one register that is associated with the security alert. The controller can determine the alert handling path using, for instance, a classification system that includes multiple classes. To enable a flexible response to security alerts of differing severity, a quantity of escalation timers or a quantity of escalation sender modules (including quantities of both) that are employed along a process flow may be varied in accordance with one or more registers associated with the classified security alert. Sending an interrupt to the processor for a given process flow can also depend on the security alert. For example, one escalation timer and one escalation sender module may be employed in one process flow, and three escalation timers and two escalation sender modules may be employed in another process flow.

A register bank can be initially configured to set one or more variables that establish alert handling paths for different alerts. For example, a length of each escalation timer may also be programmable depending on a security alert. Further, a path through a hierarchy of the escalation timers or the escalation sender modules may be adjusted. For instance, three escalation timers may be traversed in a particular order along the hierarchy of timers for one process flow, but the "middle" escalation timer may be skipped in another process flow. Once activated, an escalation sender module of the alert handler sends an escalate command to a corresponding escalation handler, which can implement a security countermeasure. Providing flexible alert handling paths for traversing escalation timers or escalation sender modules therefore enables an alert handler to tailor responses appropriately to a perceived threat.

In other implementations, an alert handler can reliably communicate with one or more other circuit components, which are called peripheral devices in this document. To do so, the alert handler includes multiple alert receiver modules to communicate with corresponding alert sender modules in respective peripheral devices. To support robust communication, each alert receiver module can be coupled to an alert sender module via a signaling pathway that includes at least two wires to enable differential signaling. Differential signaling enables attacks on the communication pathway to be more easily detected. In operation, the alert sender module of a peripheral device transmits an alert indication over the signaling pathway if the peripheral device detects suspicious activity. The alert receiver module can provide an alert acknowledgment to the alert sender module.

The alert handler can also include a ping monitor. The ping monitor uses pseudorandom values to select a peripheral device or to determine a time duration for sending a next ping request signal. The ping monitor instructs an alert receiver module to transmit the ping request signal to a corresponding alert sender module at a peripheral device using the signaling pathway coupled therebetween. In response, the alert sender module transmits a ping response back to the alert receiver module at the alert handler. If the ping response is not received within a certain time period (which may be programmable), the ping monitor issues an alert ping fail to the controller of the alert handler. By using the same communication pathway for alert transmissions and acknowledgments as is used by the ping protocol, the reliability of the communication pathway is increased. For example, if the signaling pathway for transmitting an alert indication has been severed, the ping protocol detects a failure of this pathway. The ping protocol can also be applied between multiple escalation receiver modules of multiple escalation handlers and the multiple escalation sender modules.

In further implementations, alerts can be generated in different manners. First, alerts can be generated "externally" by peripheral devices. In such cases, a peripheral device communicates the security alert to the alert handler using an alert sender module at the peripheral device and a signaling pathway that is coupled to an alert receiver module at the alert handler. Second, alerts can be generated "internally" by the alert handler, such as due to a ping protocol failure with respect to a peripheral device or an escalation handler. In each case, the alert handler can implement a programmable alert handling path for processing the security alert based on a likely level of the threat using a classification system. At the end or otherwise during an alert handling path, the alert handler can cause an escalation sender module to trigger an escalation activity, like a security countermeasure, based on a current escalation severity level along the alert handling path. In operation, the escalation sender module transmits an escalate command to an escalation receiver module at an escalation handler. In response to the escalate command, the escalation handler implements at least one protective action. Examples of such protection actions include depowering a peripheral device, deleting information, terminating a process, resetting the IC chip or a portion thereof, and so forth.

In these manners, security circuitry can be incorporated into a silicon RoT chip and/or an SoC. The security circuitry can include an alert handler that is comportable with other components to ensure expected compatibility and consistent communications. The alert handler provides a flexible scheme for addressing potential security alerts that are generated by diverse components as alert indications due to a variety of sensed stimuli. The diverse components, or peripheral devices, provide the alert indications using a signaling pathway that can propagate robust differential signaling. The alert handler escalates an alert indication in multiple ways at least partially in dependence on the source or cause of the alert indication. The alert handling path for escalating the alert processing may be based on a classification of the alert. A remedial response, or protective action, can be tailored as part of the escalation process to ultimately include at least one security countermeasure. Thus, an adaptable security response can be implemented in a trusted manner to provide functionality in a flexible and secure environment at the hardware level.

Example implementations in various levels of detail are discussed below with reference to the associated figures. The discussion below first sets forth an example operating environment and then describes example hardware, schemes, and techniques. Example methods are described thereafter with reference to flow charts or diagrams.

Example Operating Environment for Alert Handling

FIG. 1 illustrates, at 100 generally, an example apparatus 102 with an integrated circuit 104 (IC 104) that includes security circuitry 106 to implement alert handling as described herein. In this example, the apparatus 102 is depicted as a smartphone. The apparatus 102 may, however, be implemented as any suitable computing or electronic device.

Examples of the apparatus 102 include a mobile electronic device, mobile communication device, modem, cellular or mobile phone, mobile station, gaming device, navigation device, media or entertainment device (e.g., a media streamer or gaming controller), laptop computer, desktop computer, tablet computer, smart appliance, vehicle-based electronic system, wearable computing device (e.g., clothing, watch, or reality-altering glasses), Internet of Things (IoTs) device, sensor, stock management device, electronic portion of a machine or a piece of equipment (e.g., vehicle or robot), memory storage device (e.g., a solid-state drive (SSD)), server computer or portion thereof (e.g., a server blade or rack or other part of a datacenter), and the like. Illustrated examples of the apparatus 102 include a tablet device 102-1, a smart television 102-2, a desktop computer 102-3, a server computer 102-4, a smartwatch 102-5, a smartphone (or document reader) 102-6, and intelligent glasses 102-7.

In example implementations, the apparatus 102 includes at least one integrated circuit 104. The integrated circuit 104 can be mounted on a module, card, or printed circuit board (PCB) (not shown). Examples of a PCB include a flexible PCB, a rigid PCB, a single or multi-layered PCB, a surface-mounted or through-hole PCB, combinations thereof, and so forth. Each integrated circuit 104 can be realized as a general-purpose processor, a system-on-a-chip (SoC), a security-oriented IC (e.g., a RoT IC chip), a memory chip, a communications IC (e.g., a modem or radio frequency IC), a graphics processor, an artificial intelligence (AI) processor, combinations thereof, and so forth. The IC 104 can be packaged alone or together with other IC chips.

As shown, the integrated circuit 104 includes security circuitry 106. The security circuitry 106 can include a variety of parts, including multiple circuit components 108-1 . . . 108-C, where C represents a positive integer. An example of a circuit component 108 is an alert handler 110. Although not explicitly shown in FIG. 1, the integrated circuit 104 may include other portions besides the security circuitry 106. While the multiple circuit components 108-1 . . . 108-C and the alert handler 110 may be integrated together on a single IC as shown, the components may alternatively be distributed across two or more ICs. The security circuitry 106 can be realized as, for example, a protected enclave, a trusted chip platform, a hardware-based root of trust (RoT) (e.g., a silicon RoT), and so forth. Regardless of how or where the security circuitry is incorporated into an electronic device, the security circuitry may counter many different types of attacks.

Figure 2:
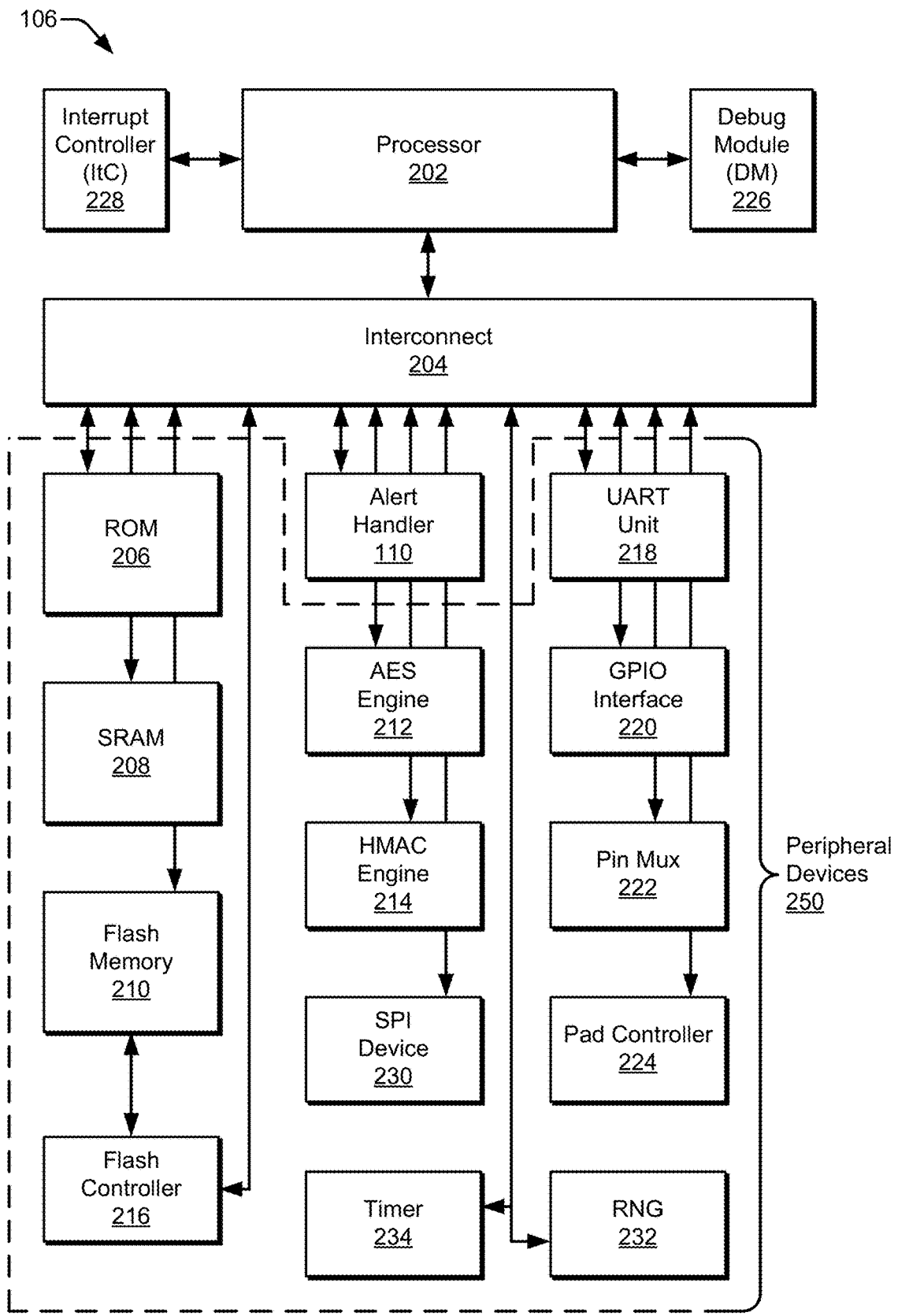
FIG. 2 illustrates example security circuitry that includes multiple circuit components, including an alert handler and multiple peripheral devices.

In example operations, once an attack—or a potential attack—is detected, an alert 112 is generated by some component. For example, a circuit component 108 can generate an alert 112 externally from the alert handler 110 and transmit the alert 112 to the alert handler 110. Additionally or alternatively, the alert handler 110 can internally generate an alert 112. In response to the nature or the source of the alert 112, the alert handler 110 selectively implements a flexible process flow for addressing the alert 112. This document describes these flexible process flows, as well as other aspects of the alert handler 110 and the security circuitry 106. Example process flows, or alert handling paths, are described below with reference to FIGS. 5-1 to 5-3. With reference to FIG. 2, however, example architectures of the security circuitry 106 are described next.

FIG. 2 illustrates example security circuitry 106 that includes multiple circuit components, including an alert handler 110. As shown, the security circuitry 106 includes a processor 202 that is coupled to an interconnect 204. The interconnect 204 can be realized using a bus, a switching fabric, or a bus network that enables the various circuit components to communicate. The multiple circuit components 108-1 . . . 108-C (of FIG. 1) can include, besides the alert handler 110, multiple memories and multiple peripheral devices. Each of the alert handler 110, the multiple memories, and the multiple other peripheral devices 250 is directly or indirectly coupled to the interconnect 204.

In example implementations, the multiple memories can include a read-only memory 206 (ROM 206), a static random-access memory 208 (SRAM 208), and a flash memory 210. The multiple peripheral devices 250 can include an advanced encryption standard (AES) engine 212 (AES engine 212), a hash-based message authentication code (HMAC) engine 214 (HMAC engine 214), a serial peripheral interface (SPI) device 230 (SPI device 230), and a flash controller 216. The multiple peripheral devices 250 can also include a universal asynchronous receiver/transmitter (UART) unit 218 (UART unit 218), a general-purpose input/output (GPIO) interface 220 (GPIO interface 220), a pin multiplexer 222 (pin mux 222), and a pad controller 224. The multiple peripheral devices 250 can further include a random number generator 232 (RNG 232) and a timer 234. Additionally, the peripheral devices 250 can include any of the memories, as shown in FIG. 2. Although certain examples of memories and other peripheral devices 250 are depicted in FIG. 2 or described herein, a given implementation of the security circuitry 106 may include more, fewer, and/or different instances of processors, controllers, memories, modules, or peripheral devices, including duplicates thereof.

The illustrated circuit components can be operated synchronously based on one or more clock signals. Although not shown in FIG. 2, the security circuitry 106 may include at least one clock generator to generate the clock signals or may include reset circuitry to reset one or more individual components separately from each other, multiple components jointly, or an entire IC chip. Alternatively, the security circuitry 106 may receive at least one clock signal or a reset signal from a source that is external to the security circuitry 106, which source may or may not be on a separate chip. One or more separate peripheral devices 250 may operate in respective individual clock domains. For instance, input/output (I/O) peripheral devices may be synchronized to a clock that is local to a respective I/O device or channel. Peripheral devices in different clock domains may operate or communicate asynchronously with respect to one another.

Example implementations of the illustrated components are described below. The processor 202 may be realized as a "main," "central," or "core" processor for the security circuitry 106. The processor 202 may, by way of example only, be implemented with a 32-bit, in-order reduced instruction set computing (RISC) core with a multi-stage pipeline. With, e.g., a RISC-V instruction set, the processor may implement an M (machine) and a U (user) mode. Activating a reset pin (not shown) (e.g., through de-assertion of an active low reset pin) causes the processor 202 to exit reset and begin executing code at its reset vector. The reset vector may begin in the ROM 206, which validates code in the emulated embedded-flash (e-flash) before jumping to it. In other words, the code should have been instantiated into the e-flash before the reset is released. In some cases, resets throughout the security circuitry 106 can be made asynchronous active low as per a comportability specification to support interoperability among the various circuit components. A reset may be generated internally via the alert handler 110, as is described below; via a watchdog timer; and so forth. Reset signals may also be sent to other circuit components, such as one of the memories or one of the peripheral devices 250.

Coupled to the processor 202 are a debug module 226 (DM 226) and an interrupt controller 228 (ItC 228). The debug module 226 provides debug access to the processor 202. By interfacing with certain pins of the IC, logic in the debug module 226 allows the processor 202 to enter a debug mode and provides an ability to inject code into the device (e.g., by emulating an instruction) or into a memory. The interrupt controller 228 may be disposed proximate to the processor 202. The interrupt core 228 can accept a vector of interrupt sources from within the security circuitry 106. The interrupt core 228 can also assign leveling and priority to the interrupts before forwarding them to the processor 202 handling.

The processor 202 can provide any desired level of performance or include any internal circuit components. For example, the processor 202 can include at least one arithmetic logic unit (ALU) (e.g., including an "additional" ALU to calculate branch targets to remove a cycle of latency on taken conditional branches) and multiple pipeline stages. With multiple pipeline stages, a pipeline can perform register writeback to reduce a cycle of latency from loads and stores and prevent a pipeline stall where a response to a load or store is available the cycle after the request. The processor 202 can implement a single-cycle multiplier or produce an imprecise exception on an error response to a store, which allows the processor to continue executing past a store without waiting for the response. Although not depicted, the processor 202 specifically, or the security circuitry 106 generally, can include an instruction cache to provide single-cycle access times for instructions.

In the illustrated example, the security circuitry 106 includes three memory address spaces for instructions and data. The ROM 206 is the target for the processor 202 after release of a reset. The ROM 206 contains hard-coded instructions to perform a subset of platform checking before checking the next stage of code. The next stage of code— e.g., a boot loader stored in embedded flash memory—can be the first piece of code that is not hard-coded into the silicon of the device. This next stage of code is therefore signature checked for integrity to increase security. The ROM 206 can execute this signature check by implementing an RSA-check algorithm on the full contents of the boot loader.

The flash memory 210 can be implemented as e-flash memory for code storage. This e-flash can house the boot loader mentioned above, as well as an operating system and applications that layer on top. The SPI device 230 can be used to bulk-load the e-flash memory. The debug module 226 may also be used for code loading. The SRAM 208 can be operated as a scratch pad SRAM that is available for data storage by the processor 202 (e.g., for stack and heap information). The SRAM 208 can also store code.

The security circuitry 106 can include a suite of "peripherals" or "peripheral devices." These peripheral devices 250 may be subservient execution units that are coupled to the processor 202 via the interconnect 204. Each of these peripheral devices 250 can follow an interface scheme that ensures comportability with each other and with the processor 202. A comportability protocol can specify how the processor 202 communicates with a given peripheral device (e.g., using the interconnect 204), how the peripheral device communicates with the chip I/O (e.g., via a fixed or multiplexable I/O), how the peripheral device communicates with the processor 202 (e.g., using interrupts), and how the peripheral device communicates security events (e.g., using alert indications) to other circuit components, such as the alert handler 110. Although not so depicted in FIG. 2, the alert handler 110 can also comprise a peripheral device 250, at least relative to the processor 202. The depicted peripheral devices 250 can comprise peripheral devices relative to the alert-related functionality provided by the alert handler 110. In these contexts, the memories can also comprise peripheral devices 250 relative to the alert-related functionality provided by the alert handler 110.

Circuit or chip I/O peripherals include the pin mux 222 and the pad controller 224. The pin mux 222 provides signaling routes between the peripheral devices 250 and available multiplexable I/O nodes of the security circuitry 106 (e.g., pins of the chip in which the various components are integrated). The pad controller 224 manages control or pad attributes like drive strength, technology, pull up versus pull down, and the like of the circuits' (e.g., the chip's) external I/O. The pin mux 222 and the pad controller 224 are themselves peripheral devices on the interconnect 204. Each may have or may otherwise be associated with at least one collection of registers that provide software configurability.

The UART unit 218 can implement UART features, such as single-lane duplex UART functionality. The outputs and inputs thereof can be configured to connect to any circuit I/O via the pin mux 222. The GPIO interface 220 creates G bits of bidirectional communication to external circuitry via the pin mux 222, where G is a positive integer like 16, 32, or 64. The SPI device 230 can implement a firmware mode. Here, the firmware mode can enable a feature that provides the ability for external drivers to send firmware upgrade code into a bank of the flash memory 210 for in-field firmware updates. The firmware mode can include addressing of the memories using SPI transactions. Although not depicted, the security circuitry 106 can include an inter-integrated circuit (I2C) host to enable command of I2C devices. This command of I2C devices may include standard, full, and fast modes.

Several security-focused peripherals are also depicted, including the encryption engines and the alert handler 110. The AES engine 212 can provide symmetric encryption and decryption using one or more protocols and varying key sizes, like 128 b, 192 b, or 256 b. The component can select encryption or decryption of data that arrives in, e.g., 16-byte quantities to be encrypted or decrypted using different block cipher modes of operation. The AES engine 212 can support electronic codebook (ECB) mode, cipher block chaining (CBC) mode, cipher feedback (CFB) mode, output feedback (OFB) mode, counter (CTR) mode, and the like. Data transfer can be made processor-available, e.g., key and data material may be passed into the component via register writes. Alternatively, private channels for the transfer of key and data material may be included to reduce exposure from potentially untrusted processor activity.

The HMAC engine 214 may utilize, for instance, the secure hash algorithm (SHA) SHA-256, as a hashing algorithm. SHA-256 is a member of the SHA-2 family of hashing algorithms, in which the digest (or hash output) is of 256 b length, regardless of the data size of the input to be hashed. The data is sent into the HMAC peripheral device after declaring the beginning of a hash request. This zeroes out the internal state to initial conditions, 32 b at a time. Once the data has been sent by a component client, the client can indicate the completion of the hash request (with optional partial-word final write). The HMAC engine 214 produces the hash result and makes it available for register read by the requesting client. The data transfer may be made processor-available or may be made private to reduce exposure to potentially untrusted processor activity.

HMAC is a message authentication protocol layered on top of a hashing function (e.g., SHA-256), and HMAC mixes in a secret key for cryptographic purposes. HMAC is a particular application of appending the secret key in a prescribed manner, such as twice, around the hashing (via SHA-256) of the message. To provide this functionality, a 256 b key may be programmed into the circuit component before the message hash begins. The timing of authentication completion can vary and may be longer in latency than using native SHA-256. Here again, the hashing information or the secret key may be made processor-available for convenience or processing efficiency or may be rendered private in some manner for increased security.

The alert handler 110 is responsible for processing and responding to alerts, including ones provided from other peripheral devices 250. The alerts can be considered security-sensitive interrupts that are to be handled in a timely manner to respond to a perceived security threat. Unlike "standard" interrupts, alerts are not handled solely by software executing on the processor 202. Alerts can trigger a first-stage request to be handled by software as a "regular" interrupt. If, however, the software is not able to respond and remedy the alert-triggered interrupt, then the alert handler 110 triggers a second-stage response. This ensures that the underlying issue—the perceived security threat—is addressed even if the processor 202 is busy, wedged, or also under attack.

Each peripheral device 250 can present a list of individual alerts that represent individual potential threats to be handled. These alerts can be transmitted using a particular encoding mechanism to the alert handler 110 as an alert indication. The alert handler 110 is described further below, starting with FIG. 3. As indicated above, the alert handler 110 can also be a peripheral device 250 on the interconnect 204, at least relative to the processor 202.

The security circuitry 106 can also include the RNG 232. Randomness can contribute to the security functionality by providing variations in execution that can keep attackers from predicting a good time to launch an attack. A random number can provide secret material used for identity and cryptographic purposes. The RNG 232 can be seeded into algorithmic computation to obscure sensitive data values. Generally, the RNG 232 can perform better as its number generation becomes increasingly truly random and to the extent it can also be hardened against attack. The RNG 232 may be implemented as a "true" RNG (TRNG), which may involve a design having an analog portion to take advantage of some physical event or process that is non-deterministic. Example TRNG designs rely on metastability, electronic noise, timing variations, thermal noise, quantum variation, and so forth. The TRNG filters the resulting variable(s) and sends them into a pool of entropy that the device can sample at a given time for a current randomized function. In some cases, an interface to the entropy pool can include a read request of available random bits. The TRNG interface indicates how many bits are available, and the requesting peripheral device or software can read from this pool, to the extent bits are available. Attempted reading of entropy bits that are not available can trigger an interrupt or an alert.

Two other peripheral devices 250 include the timer 234 and the flash controller 216. The timer 234 can, for example, support accurate performance by the processor 202. The timer 234 is formed from multiple bits (e.g., 64 bits) and operates as a free running timer with a guaranteed frequency, to within some percentage. Another timer (not explicitly shown) can act as a watchdog timer to backstop the processor 202 in case the processor becomes unresponsive. The unresponsiveness may be due to development code that is wedged, a security attack, and so forth.

The flash controller 216 controls the flash memory 210, which is available for code and data storage. The primary read path for this data can be in the standard memory address space. Writes to that address space can be ignored, however, because flash is not written to in a standard way. Instead, to write to the flash memory 210, software interacts with the flash controller 216. The flash functionality can include three primary commands: read, erase, and program. Read can be standardized and use the chip memory address space. Erase is performed at a page level, where the page size is parameterizable by the flash controller 216. Upon receiving an erase request, the flash controller 216 wipes the contents of the target page, which renders the data into a "1" state (e.g., 0xFFFFFFFF per word). Afterwards, software can program individual words to any value. A flash bit is not returned to a "1" state without another erase, so future content is effectively changed with an AND of the current content and the written value. Erase and program commands are relatively slow. A typical erase time is measured in milliseconds, and program times are in the range of microseconds. Security is also a concern because secret data can be stored in the flash memory 210. Some memory protection can therefore be provided by the flash controller 216. For example, a memory (e.g., e-flash or SRAM) can be protected with encryption. In some cases, to lower a processing burden and thereby enable less complex hardware to perform the encryption and decryption, a relatively lightweight encryption, or memory scrambling technique, can be implemented using a reduced-strength cipher.

The security circuitry 106 is depicted in FIG. 2 with a particular set of circuit components. A given security circuitry 106 can, however, have more, fewer, or different circuit components. The circuit components may also be interconnected differently or operate in manners besides those example manners described above. Further, some circuit components may be omitted while other circuit components are implemented in multiple instances. For example, the alert handler 110 may be duplicated, or multiple AES encryption engines 212 may be present as part of some security circuitry 106. Further, a GPIO interface 220 may be omitted from the peripheral devices 250 that interact with the alert handler 110 for IC chips in which the security circuitry 106 forms but one core among dozens.

Example Schemes, Techniques, and Hardware for Alert Handling

The security circuitry 106 (e.g., of FIG. 2) can process alerts using, at least partly, the alert handler 110. This document describes example functionality of the alert handling mechanism. The alert handler 110 can be implemented as a component that operates as a peripheral device 250 on the interconnect 204. The alert handler 110 can therefore adhere to comportability specifications for the security circuitry 106. An alert 112 (of FIG. 1) can be implemented as an interrupt-type signal, or alert indication, that is received from other peripheral devices and that is indicative of a potential security threat. In operation, the alert handler 110 can gather alerts from other circuit components of the device and convert them into interrupts that the processor 202 can address. If the processor 202 does not clear the interrupt, however, the alert handler 110 provides hardware responses to address the potential security threat.

Certain example implementations can provide one or more of the following features. First, the alert handler 110 receives differentially signaled, synchronous or asynchronous alert indications from peripheral device sources. The peripheral devices 250 can generate alerts based on the functions, knowledge, or sensed parameters of the peripheral devices 250. Second, the alert handler 110 performs ping testing of the alert sources. A ping monitor requests periodic alert responses from each alert source to ensure communication channels with the alert sources are functioning. Third, register locking can be implemented on configuration registers. Once locked, a register cannot be modified by software until a next system reset.

Fourth, the alert handler 110 implements an assignment mechanism to assign individual alerts to a particular alert class using, for example, a register-based technique. The system can implement any quantity of alert classes, like three or four, and any of the classes can be individually disabled. The alert handler 110 generates an interrupt that corresponds to the assigned alert class for transmission to the processor 202. Fifth, the alert handler 110 stores a disambiguation history to enable software to determine which alert caused a given class interrupt. Although a disable command can allow for alerts to be ignored, disablement is used for cases in which an alert is faulty. Undesirable access can be protected against by locking the register state after the initial configuration is created.

Sixth, each alert class has a configurable response time or alert quantity before an escalation step is taken. The alert handler 110 can implement escalation controls that are register based. In some cases, a duration of an escalation timer can be established with a register. In other cases, a quantity of alerts can be established to control escalation. To do so, a value in a register represents the quantity of alerts that are to occur in a given class before an escalation step is implemented. A timeout for an unresolved interrupt request (IRQ) that was sent responsive to an alert can also trigger escalation. Seventh, a configurable escalation mechanism of the alert handler 110 enables multiple escalation command signals (e.g., four) to be generated sequentially or in response to some event. As part of the escalation mechanism, the alert handler 110 can map a given escalated alert to a non-maskable interrupt (NMI), a wipe-secrets signal, a lowering of privilege for another component, a chip reset, and so forth. The escalation command signals can be differentially signaled and a signaling pathway to an escalation handler can be safeguarded using a heartbeat verification technique. A failure with the heartbeat verification can detect if there is a problem at the escalation handler. The alert handler 110 can also implement configurable times for stepping between each escalation level.

Eighth, the alert handler 110 produces two locally sourced hardware alerts. A first locally sourced alert is generated if differential signaling with an alert source or an escalation handler fails—e.g., if a signal integrity check fails. The alert handler 110 generates a second such alert if an alert source or an escalation handler fails to respond to a ping request. Generally, the alert handler 110 can receive incoming alerts from throughout the system, classify the alerts, issue interrupts based on the classified alerts, and escalate interrupts to hardware-based responses if the processor 202 does not clear an issued interrupt. The alert handler 110 can therefore act—e.g., act as a stand-in for security responses—if the processor cannot or does not handle a security alert.

In some described architectures, a security alert is intended to be a rare event, at least relative to "standard" interrupts. Accordingly, at a design stage, a possible event may be designated as an alert event to the extent the event is expected to not happen frequently and if the event has potential security consequences. Examples of such events are parity errors (which might indicate an attack), unauthorized actions on cryptographic or security-related components, sensed values from physical sensors indicating environmental modification (e.g., voltage or temperature), and so forth. Examples of physical sensors, in addition to a voltage sensor or a temperature sensor, include a breach sensor to detect a piercing or other intrusion through a physical shield, a light sensor to detect laser impulses, and a glitch sensor to detect a transient fluctuation or fault, just to name a few. The system routes alerts through the alert handler 110, which converts the alerts to interrupts for the processor 202 to potentially address. An underlying expectation, for some implementations, is that a secure operating system has a protocol for handling in software any such alert-derived interrupt. If so, the secure operating system should usually resolve the interrupt and then clear the interrupt with the alert handler 110.

Nonetheless, the alert handler 110 can enable the security circuitry 106, and thus at least a portion of an IC chip, respond to security threats if the processor 202 becomes untrusted. The processor 202 can become untrusted if it has been attacked, if it is not responding, and so forth. To help combat security issues, the alert handler 110 escalates alerts beyond a processor interrupt. The alert handler 110 can provide multiple escalation signals that are routed to different chip functions for responding to attacks. These can include such functions as wiping secrets on the chip, powering down at least a portion of the chip, resetting at least part of the chip, and so forth.

To ease software management of alerts, the alert handler 110 can provide an alert classification mechanism in which each alert is classified into one of multiple classes. The classification can be enacted in any of many possible manners using configurable process flows to provide a flexible alert handling mechanism. Alerts having similar profiles can be classified together. A profile can pertain to a risk of occurrence, a degree of security concern, a frequency of false triggering, and so forth. For each alert class, a counter of alerts can be maintained in an accumulator. If the counter meets a programmable maximum value for a corresponding class, then the escalation protocol for that class is started. The counter can be cleared by the alert handler 110, by software, and so forth. These features, functions, and techniques can be provided by the components depicted in FIG. 3.

Figure 3:
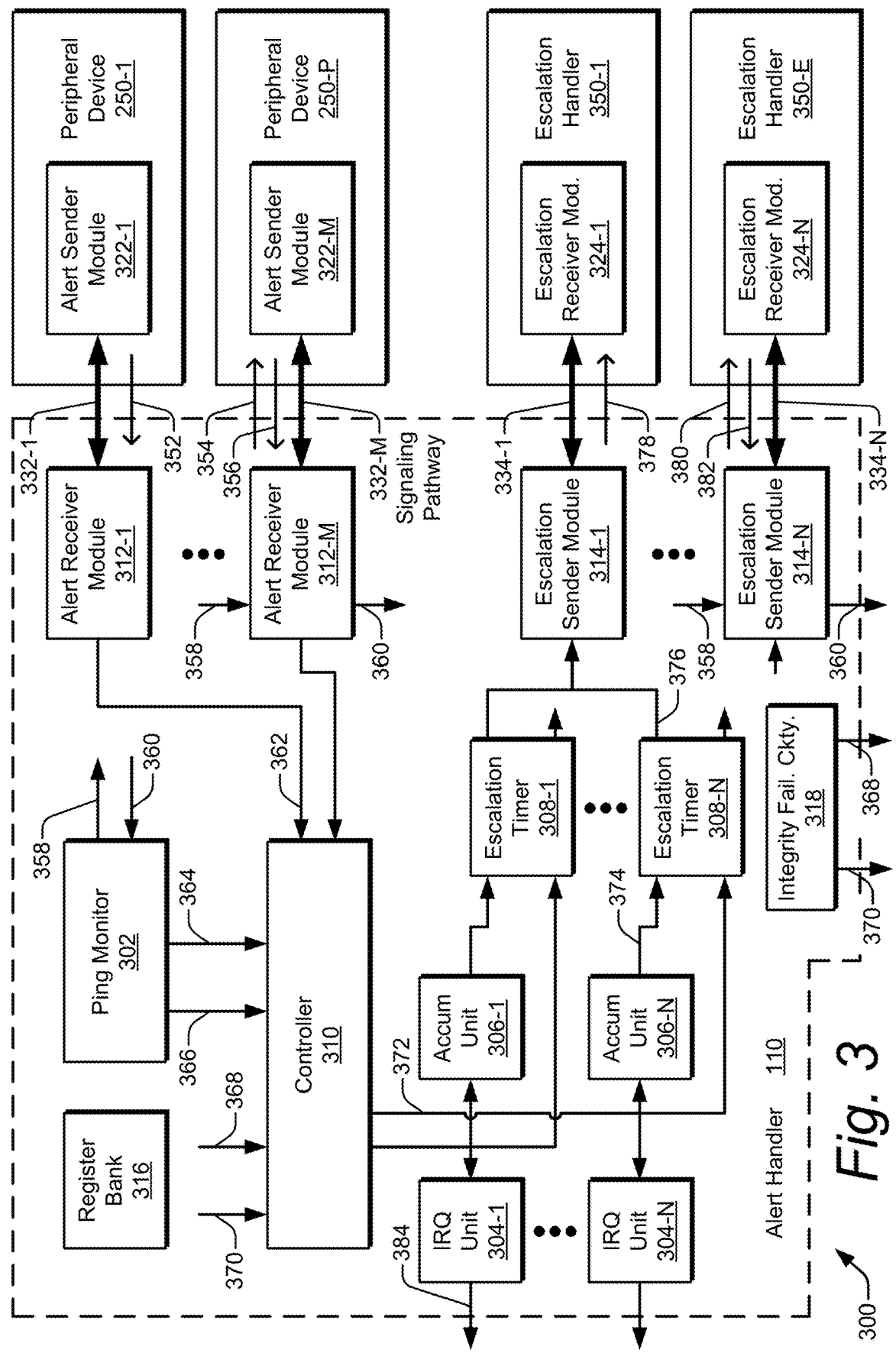
FIG. 3 illustrates an example alert handler coupled to multiple peripheral devices and multiple escalation handlers.

FIG. 3 illustrates, generally at 300, an example alert handler 110 that is coupled to multiple peripheral devices 250-1 . . . 250-P and multiple escalation handlers 350-1 . . . 350-E. The variables P and E represent positive integers that may be the same as or different from each other. In example implementations, the alert handler 110 is coupled to the multiple peripheral devices 250-1 . . . 250-P and to the multiple escalation handlers 350-1 . . . 350-E. The alert handler 110 includes multiple alert receiver modules 312-1 . . . 312-M, multiple escalation sender modules 314-1 . . . 314-N, at least one controller 310, at least one ping monitor 302, at least one register bank 316, and integrity failure circuitry 318. The variables M and N represent positive integers that may be the same as or different from each other, as well as the other variable used herein. The alert handler 110 also includes multiple IRQ units 304-1 . . . 304-N, multiple accumulation units 306-1 . . . 306-N, and multiple escalation timers 308-1 . . . 308-N.

Although certain sets of circuit components are denoted as having a quantity of N, each set may have a differing quantity of such components depending on context or implementation. Thus, the variables P, E, M, and N may be the same as each other or different. For example, a given peripheral device 250 may have two or more alert sender modules 322. In such cases, the variable M may be greater than the variable P. This can occur if, for instance, the peripheral device 250 is monitoring for multiple different potential security threats. As another example, each escalation handler 350 may include one escalation receiver module 324. If so, the variables N and E may be equal.

Each alert receiver module 312 of the multiple alert receiver modules 312-1 . . . 312-M is coupled to at least one peripheral device 250 of the multiple peripheral devices 250-1 . . . 250-P. Each escalation sender module 314 of the multiple escalation sender modules 314-1 . . . 314-N is coupled to at least one escalation handler 350 of the multiple escalation handlers 350-1 . . . 350-E. The multiple escalation timers 308-1 . . . 308-N are coupled to the multiple escalation sender modules 314-1 . . . 314-N. Each respective escalation timer 308 can correspond to a respective escalation severity of multiple escalation severities. Similarly, each respective escalation handler 350 of the multiple escalation handlers 350-1 . . . 350-E can correspond to a respective escalation severity of multiple escalation severities. Example escalation severity hierarchies that can be configured across the escalation circuit components are described below with reference to FIG. 4.

In example operations, the controller 310 is coupled to the multiple alert receiver modules 312-1 . . . 312-M and the multiple escalation timers 308-1 . . . 308-N. The controller 310 classifies a triggered alert that is received from an alert receiver module 312 into a classification of multiple classifications, or into an alert class of multiple alert classes. The classification can be based on the alert receiver module 312, the corresponding peripheral device 250, an alert sender module 322 thereof, and so forth. The controller 310 initiates an escalation timer 308 of the multiple escalation timers 308-1 . . . 308-N based on the classification. Classification is described further below with reference to FIG. 4-1.

Each peripheral device 250 of the multiple peripheral devices 250-1 . . . 250-P includes at least one alert sender module 322 of multiple alert sender modules 322-1 . . . 322-M. Each respective alert receiver module 312 of the multiple alert receiver modules 312-1 . . . 312-M is coupled to a respective alert sender module 322 of the multiple alert sender modules 322-1 . . . 322-M via a respective signaling pathway 332 of multiple signaling pathways 332-1 . . . 332-M. Each escalation handler 350 of the multiple escalation handlers 350-1 . . . 350-E includes at least one escalation receiver module 324 of multiple escalation receiver modules 324-1 . . . 324-N. Each respective escalation sender module 314 of the multiple escalation sender modules 314-1 . . . 314-N is coupled to a respective escalation receiver module 324 of the multiple escalation receiver modules 324-1 . . . 324-N via a respective signaling pathway 334 of multiple signaling pathways 334-1 . . . 334-N. Each signaling pathway 332 and 334 includes at least one differential path.

In example operations, the controller 310 can process alerts from internal and external sources. The external sources include the multiple peripheral devices 250. An alert receiver module 312 receives an alert indication 352 from a corresponding alert sender module 322. The alert receiver module 312 forwards the alert indication 352 to the controller 310 as a triggered alert 362. At this point, the triggered alert 362 corresponds to an unclassified triggered alert. The alert indication 352 reflects that the corresponding peripheral device 250 has detected a potential security threat. For clarity, certain signals are depicted with respect to one circuit component even though such signals may be applicable to other instances of the same type of circuit component. For example, although the alert indication 352 is depicted as being transmitted from the alert sender module 322-1 of the peripheral device 250-1 to the alert receiver module 312-1 of the alert handler 110, the alert sender module 322-M of the peripheral device 250-P can also transmit an alert indication 352 to the alert receiver module 312-M of the alert handler 110.

The internal or local sources of alerts, which the controller 310 can also process, include the ping monitor 302 and the integrity failure circuitry 318. Because the alert handler 110 is in communication with peripheral devices 250 and escalation handlers 350, and because failures can pertain to signal integrity or the pinging mechanism for the various signaling pathways 332 and 334, these internal sources can produce four different alerts (e.g., two types of security issues that may each correspond to two types of component equates to four different alerts). These internally sourced alerts include an alert ping failure 364, an escalation ping failure 366, an alert integrity failure 368, and an escalation integrity failure 370. Each of these alerts may be communicated using a corresponding signal.

Each signaling pathway 332 or 334 can be realized using one or more wires. Two or more wires can realize a signaling pathway 332 or 334 if a differential signaling protocol is implemented on the pathway. With differential signaling, as compared to single-ended signaling, additional integrity checks can be made for security purposes to ensure that the signaling pathway has not been compromised. The integrity failure circuitry 318 can make one or more such checks. For example, the integrity failure circuitry 318 can monitor the pair of wires used for differential signaling to ensure that opposite-valued voltages are applied to the two wires, at least during signaling times. If a signaling pathway 332, which couples to a peripheral device 250, is compromised, the integrity failure circuitry 318 sends an alert integrity failure signal 368 to the controller 310. If a signaling pathway 334, which couples to an escalation handler 350, is compromised, the integrity failure circuitry 318 sends an escalation integrity failure signal 370 to the controller 310. Example approaches for the controller 310 to process these path integrity failure signals 368 and 370 are described below.

The alert handler 110 also uses an example ping mechanism to ensure that peripheral devices 250 and escalation handlers 350 are functioning and that communication is possible. The ping monitor 302, in conjunction with communication modules, implements the ping mechanism. The ping monitor 302 issues a ping instruction 358. The alert receiver module 312-M receives the ping instruction 358. In response to the ping instruction 358, the alert receiver module 312-M transmits a ping request 354 to the alert sender module 322-M of the peripheral device 250-P. To confirm that the peripheral device 250-P is functioning, and that the signaling pathway 332-M is working, the alert sender module 322-M returns a ping response 356 to the alert receiver module 312-M.

Based on the confirming ping response signal 356, the alert receiver module 312-M provides a ping okay message 360 to the ping monitor 302. If the ping monitor 302 receives a ping ok message 360 within a ping duration period after issuing the ping instruction 358, the ping monitor 302 identifies the peripheral device 250-P as being functional for this round. On the other hand, if a ping okay message 360 is not returned within the ping duration period, the ping monitor 302 issues an alert ping failure signal 364 to the controller 310. The ping duration may be configurable, including by programming a register of the register bank 316. Example approaches for the controller 310 to process this failure signal 364 are described below.

The ping mechanism is also responsible for ensuring that the escalation handlers 350 are in communication with the alert handler 110 and are functional using one or more ping requests. The ping monitor 302 issues a ping instruction 358 to the escalation sender module 314-N, and the escalation sender module 314-N receives the ping instruction 358. In response to the ping instruction 358, the escalation sender module 314-N transmits a ping request 380 to the escalation receiver module 324-N of the escalation handler 350-E. To confirm that the escalation handler 350-E is functioning and that the signaling pathway 334-N is working, the escalation receiver module 324-N returns a ping response 382 to the escalation sender module 314-N.

Based on the confirming ping response signal 382, the escalation sender module 314-N provides a ping okay message 360 to the ping monitor 302. If the ping monitor 302 receives a ping ok message 360 within a ping duration period after issuing the ping instruction 358, the ping monitor 302 identifies the escalation handler 350-E as being functional for this round of pings. On the other hand, if a ping okay message 360 is not returned within the ping duration period, the ping monitor 302 issues an escalation ping fail signal 366 to the controller 310. Example approaches for the controller 310 to process this signal 366 are described below.

The ping monitor 302 can determine wait periods between ping exchanges and an order for targets of the ping instruction 358. Each wait period can be stochastically determined to increase the security provided by the pinging mechanism. Thus, the ping monitor 302 can use a random number generator (RNG) (e.g., a pseudo RNG (PRNG) or a true RNG (TRNG)) to establish each wait period (e.g., a randomized time duration) between successive issuances of ping instructions 358 to a same module or to a next module. Additionally or alternatively, a next target (e.g., a peripheral device 250 or an escalation handler 350) for the ping message exchange can also be randomly determined. The randomization makes spoofing a correct ping okay message 360 by artificially transmitting a ping response signal 356 or 382 from the right component at the right time more difficult.

Upon receipt of an alert signal, the controller 310 processes the alert signal. As described above, the alert signal can include a triggered alert 362 that is received from an alert receiver module 312 but that "originated" from a peripheral device 250, an alert ping failure signal 364, an escalation ping failure signal 366, an alert integrity failure signal 368, an escalation integrity failure signal 370, and so forth. The controller 310 assigns a classification to the alert signal based, at least partly, on a source of the alert signal, a cause of the alert signal, or a meaning of the alert signal. A source or cause can include a peripheral device 250 or a corresponding alert receiver or sender module, an escalation handler 350 or a corresponding escalation sender or receiver module, the integrity fail circuitry 318, the ping monitor 302, and so forth. The meaning can relate to a communication failure due to integrity or ping failure, an affirmative alert from a peripheral device due to an alert event, a nature of the alert event, combinations thereof, and so forth. The nature of the alert event can pertain to how likely an attack, if one is occurring, is to be severe in terms of exposed information, compromised account access, device damage, and so forth.

Based on the determined classification, the controller 310 initiates at least one alert handling path. Each alert handling path corresponds to at least one classification level. An alert handling path can progress or flow through one or more of the multiple IRQ units 304-1 . . . 304-N, one or more of the multiple accumulator units 360-1 . . . 306-N, one or more of the escalation timers 308-1 . . . 308-N, one or more of the escalation sender modules 314-1 . . . 314-N, and one or more of the escalation receiver modules 324-1 . . . 324-N to potentially reach at least one escalation handler 350 of the multiple escalation handlers 350-1 . . . 350-E. The various configurable alert handling paths can be selected to flexibly address the multitude of potential vectors that may be used to attack an IC chip. Example alert handling paths are described below with reference to FIGS. 5-1 to 5-3.

In some cases, a determined alert classification corresponds to an alert handling path that starts with a first classification level. If so, the controller 310 causes the IRQ unit 304-1 to issue an interrupt 384 to the processor 202 or the associated interrupt controller 228 (ItC 228) (both of FIG. 2). The controller 310 also starts an escalation timer, such as the escalation timer 308-1, and will await expiration of the timer. In the meantime, the controller 310 can track or maintain a total quantity of alerts received at the first classification level or from a same alert receiver module 312 using the accumulation unit 306-1. Generally, each respective accumulation unit 306 can accumulate a respective count of those alerts that correspond, for instance, to a respective alert classification. If the processor 202 does not resolve and clear the interrupt before the timer expires, or responsive to the controller 310 failing to receive a response to the interrupt from the processor 202, the controller 310 can escalate the progression along the corresponding alert handling path. Thus, if the timer expires or if the accumulated quantity reaches a threshold, the controller 310 progresses the response along the alert handling path. For example, the path can progress from the accumulation unit 306-1 to the escalation timer 308-1 or from the escalation timer 308-1 to the escalation sender module 314-1 (or both).

In this example, however, the controller 310 progresses the alert handling path from the first classification level to an Xth classification level, which correspond to the illustrated Nth circuit components—namely the Nth accumulation unit 306-N, escalation timer 308-N, and escalation sender module 314-N. To do so, the controller 310 issues a triggered class alert 372 to any one or more of the following: the IRQ unit 304-N, the accumulation unit 306-N, or the escalation timer 308-N. In response, the IRQ unit 304-N may issue an interrupt 384 for the processor to handle. The accumulation unit 306-N can also increment an accumulated value indicative of a quantity of Xth classification level alerts that have been triggered or representative of a quantity of alerts from a given alert receiver module 312. Further, the escalation timer 308-N can start an escalation timer for the Xth classification level.

While the escalation timer is elapsing and triggered alerts are being accumulated, the controller 310 is comparing a quantity of triggered alerts to an alert quantity threshold. If an accumulated count of the accumulation unit 306-N reaches an alert quantity threshold (e.g., for the Xth classification level), the accumulation unit 306 produces a class accumulation indication 374 for the Xth classification level. The accumulation unit 306-N provides the class accumulation indication 374 to the escalation timer 308-N. In response, the escalation timer 308-N can initiate a new or un-started timer, advance a started timer by some amount, ignore the indication, or issue an escalation instruction 376. Further, the escalation timer 308-N can issue an Xth classification escalation instruction 376 based on expiration of a timer of the escalation timer 308-N. The escalation timer 308-N provides the escalation instruction 376 to one or more of the multiple escalation sender modules 314-1 . . . 314-N.

In this example alert handling path, the escalation timer 308-N issues the escalation instruction 376 to the escalation sender module 314-1. More generally, the controller 310 can be responsible for instructing an escalation sender module 314 to send an escalate command 378 to an escalation handler 350. In response, the escalation sender module 314-1 transmits an escalate command 378 to the escalation receiver module 324-1 of the escalation handler 350-1 via the signaling pathway 334-1. Responsive to receiving the escalate command 378, the escalation handler 350-1 performs at least one security countermeasure. A security countermeasure can include, for example, erasing stored data, disconnecting a suspect peripheral device of the multiple peripheral devices from at least one interconnect, collapsing a power domain that includes the suspect peripheral device, resetting at least a portion of an integrated circuit, and so forth. Example communications between the alert handler 110 and an escalation handler 350 are described below with reference to FIG. 7. Example power domains are described next with reference to FIG. 4-1.

Figures 1, 4:
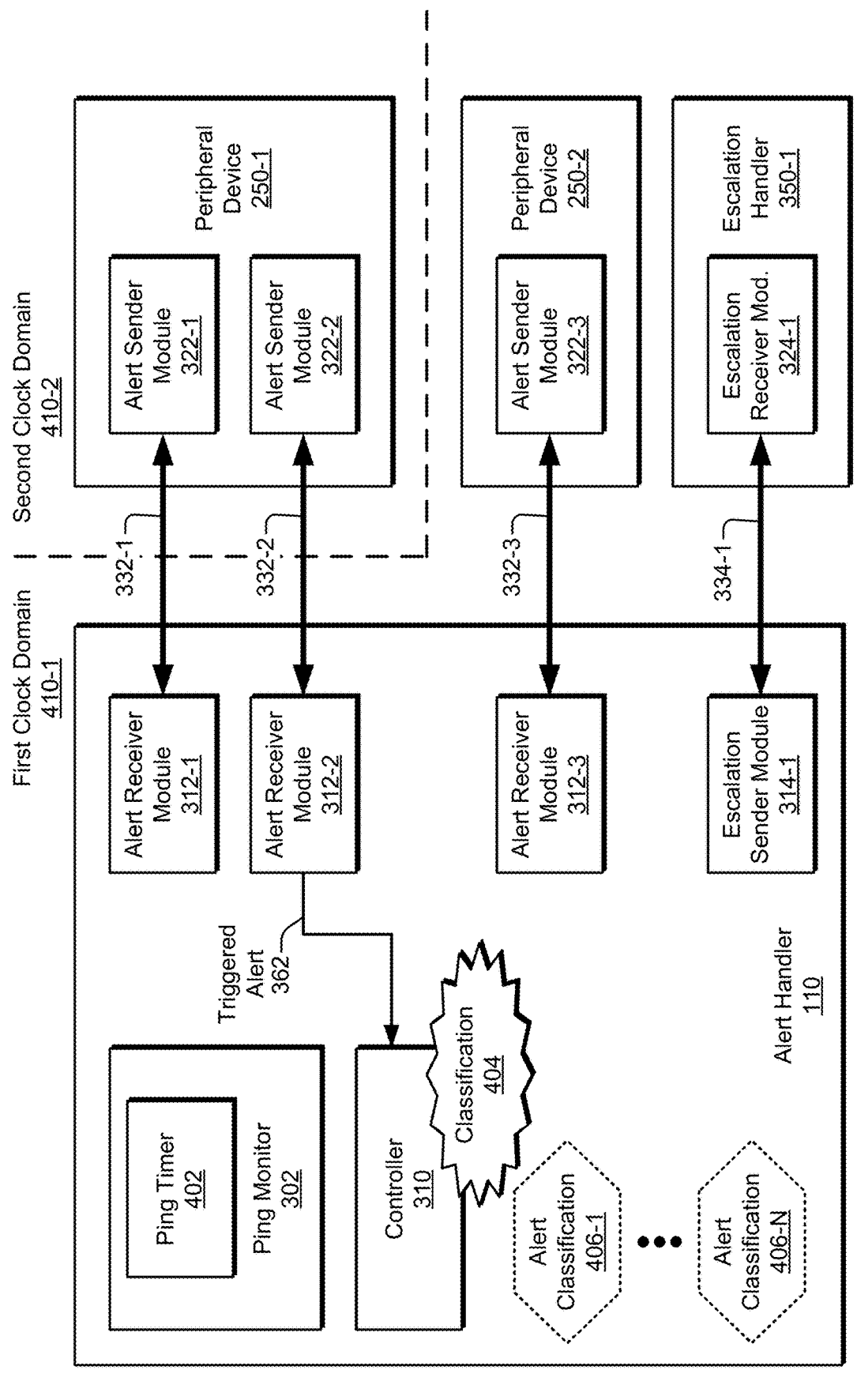
Figures 2, 4:
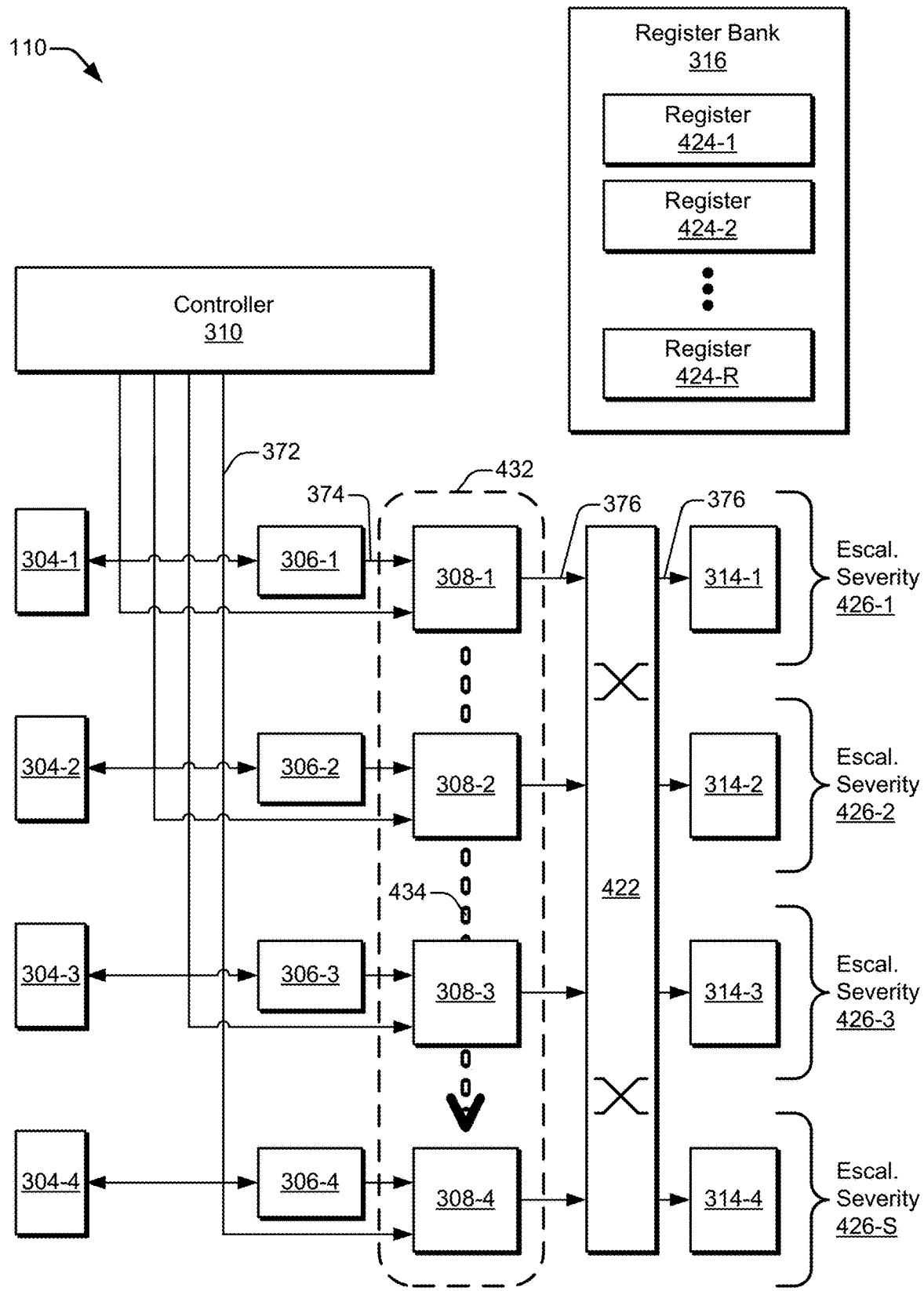

FIG. 4-1 illustrates at 400-1 additional example aspects of an alert handler 110 that is coupled to multiple peripheral devices 250-1 . . . 250-P and multiple escalation handlers 350-1 . . . 350-P. As shown, a first alert receiver module 312-1 is coupled to a first alert sender module 322-1 of a first peripheral device 250-1 via a first signaling pathway 332-1, and a second alert receiver module 312-2 is coupled to a second alert sender module 322-2 of the first peripheral device 250-1 via a second signaling pathway 332-2. Thus, a single peripheral device 250 may include multiple alert sender modules, and the alert handler 110 may include a respective alert receiver module for each of them. A third alert receiver module 312-3 is coupled to a third alert sender module 322-3 of a second peripheral device 250-2 via a third signaling pathway 332-3. Also, a first escalation sender module 314-1 is coupled to a first escalation receiver module 324-1 of a first escalation handler 350-1 via a first signaling pathway 334-1.

In some implementations, a root-of-trust (ROT) chip or other security circuitry 106 (e.g., of FIGS. 1 and 2) includes multiple clock domains 410 to enable different components to operate at different clock frequencies at various times or to enable clock jitter for security purposes with certain components. In FIG. 4-1, the circuitry includes a first clock domain 410-1 and a second clock domain 410-2. The first peripheral device 250-1 is disposed in the second clock domain 410-2, but the other illustrated components operate in the first clock domain 410-1. Accordingly, communications between the first and second alert receiver modules 312-1 and 312-2 and the first and second alert sender modules 322-1 and 322-2 across the first and second signaling pathways 332-1 and 322-2, respectively, may be performed asynchronously to accommodate potential different clock frequencies. Communications across the third (alert) signaling pathway 332-3 and the first (escalation) signaling pathway 334-1 may be performed synchronously due to the common clock domain.

In example implementations, the controller 310 classifies a triggered alert 362 that is received from an alert receiver module 312, like the second alert receiver module 312-2. A classification 404, or classification operation 404, is performed responsive to the triggered alert 362 and based on the second alert receiver module 312-2 that provided the triggered alert. This second alert receiver module 312-2 is known to correspond to a given peripheral device 250 or an alert event thereof, based on an identity of the originating peripheral device, which is the first peripheral device 250-1 in this example. Thus, the classification 404 is also based on the peripheral device 250 or the alert event detected thereby. Although not shown in FIG. 4-1, the classification 404 may also be performed responsive to an "internal alert" of the alert handler 110. Internal alerts include an alert ping failure, an escalation ping failure, an alert integrity failure, and an escalation integrity failure, as described above with reference to FIG. 3.

The classification operation 404 classifies an alert into an alert classification 406 of multiple alert classifications 406-1 . . . 406-N using, e.g., one or more registers. In some cases, the variable N for a number of alert levels may correspond to the variable N for the number of accumulation units 306, escalation timers 308, and so forth. In other cases, these two variables may have different values. An example system with four levels of alert classification 406 and four levels of escalation severity is described below with reference to FIG. 4-2.

The ping monitor 302 may include a ping timer 402. The ping timer 402 enables the ping monitor 302 to perform ping operations based on a time interval or time duration. Durations or timeouts tracked by the ping timer 402 can be determined at least pseudo-randomly using a linear-feedback shift register (LFSR). Example approaches to random-number generation are described below.

In some implementations, the inputs for the ping instruction signal 358 at the multiple alert receiver modules 312 and the multiple escalation sender modules 314 within the alert handler 110 are coupled to the ping monitor 302. This is described above with reference to FIG. 3. The ping monitor 302 determines a random number of wait cycles between successive ping requests. Further, the ping monitor 302 also randomly selects a particular differential path, peripheral device 250, or escalation handler 350 to be pinged. This makes it more difficult to predict the next ping occurrence based on past observations.

The ping timer 402 (of FIG. 4-1) can be implemented using an LFSR-based PRNG of Galois or Fibonacci type. In order to increase the entropy of the pseudo random sequence, one random bit or multiple random bits from the TRNG is or are XOR'ed into the LFSR state every time a new random number is drawn (e.g., which can happen every few 10 k cycles). The LFSR is m bits wide. The bits for the random timer count include n bits, with m>n. The remaining (m–n) bits are used to randomly select which peripheral device 250 is pinged next.

After selecting one of the peripheral devices 250 to ping, the ping monitor 302 waits until either the corresponding ping okay message line is asserted or until the programmable ping timeout value is reached. In both cases, the ping monitor 302 proceeds with the next ping. In the second case, however, the ping monitor 302 additionally raises a "ping failure" alert 364 or 366 for either an alert path or an escalation path. The timeout value can be a function of the ratios between the alert handler clock and any peripheral clocks present in a multiple-clock domain system. The timeout value can be programmed at startup time via a register 424 (e.g., of FIG. 4-2). The ping timer 402 can be started as soon as the initial configuration phase is completed and the registers 424 of the register bank 316 have been locked in. In some cases, the ping monitor 302 can directly flag a "ping fail" alert if a spurious "ping ok" message arrives that has not been requested.

FIG. 4-2 illustrates additional example aspects relating to escalation severity for an alert handler 110. As shown, the register bank 316 includes multiple registers 424-1, 424-2, . . . , 424-R, with R representing a positive integer. The multiple registers 424-1 . . . 424-R can be configured at design/fabrication or during runtime via software or firmware. Each register 424 stores at least one value that establishes some programmable aspect of processing alerts using at least one alert handler path. For example, a register 424 can establish a count threshold value for at least one accumulation unit 306, a time duration for at least one escalation timer 308, routing information for adapting an alert handling path, and so forth.

In example implementations, each escalation timer 308 can be coupled to more than one escalation sender module 314. For instance, each escalation timer 308 can selectively issue an escalation instruction 376 to any of the multiple escalation sender modules 314. As shown, the multiple escalation timers 308 are coupled to the multiple escalation sender modules 314 via at least one switch matrix 422. The switch matrix 422 can include, for example, a set of multiplexers (not explicitly shown) that can selectively couple an escalation instruction 376 sent by any escalation timer 308 to any escalation sender module 314.

In the illustrated example of FIG. 4-2, there are four levels of components. Thus, the variable N of the IRQ units 304, the accumulation units 306, the escalation timers 308, the escalation sender modules 314, the alert classifications 406, etc. equates to an example of four in FIG. 4-2, and in FIGS. 5-1 to 5-3 as described below. Each component level corresponds to an escalation severity 426 of multiple escalation severities 426-1, 426-2, 426-3, . . . , 426-S, with S corresponding to a positive integer. Although four levels of escalation severity 426 are depicted in FIG. 4-2 and described herein (e.g., S=4), security circuitry can provide or implement a different quantity of levels.

With increasing alert classification and escalation severity levels, the illustrated components form a logical hierarchy of increasing escalation severity. A hierarchy 434 of increasing escalation severity 426 is indicated relative to the multiple escalation timers 308-1 . . . 308-4 in a group 432 of escalation timers 308. Although not explicitly shown, each group of components, such as the multiple accumulation units 306-1 to 306-4 or the multiple escalation sender modules 314-1 to 314-4, can also represent a hierarchy of increasing escalation severity. While processing an alert, an alert handling path can step to a next component (e.g., a next escalation timer 308) along the hierarchy 434. Alternatively, an alert handling path can skip the next component along the hierarchy 434 to reach another component (e.g., another escalation timer 308) along the hierarchy 434 of a group of components. By skipping a component along the hierarchy 434, the alert handler 110 can advance more quickly along the hierarchy 434 to a higher escalation severity 426 or bypass a security countermeasure that is not applicable to counteracting a given alert. Example alert handling paths are described below with reference to FIGS. 5-1 to 5-3.

Regarding alert classification and interrupt signaling, in some implementations, each of the incoming and local alert signals can be classified generically to one of N classes or disabled with no classification. With a four-class example (e.g., N=4), the four alert classifications 406-1 to 406-4 can be designated as classes A, B, C, and D. Each alert classification can be defined in hardware, firmware, and/or software. Factors to consider include that some alert types are similar to others, some alert types are "noisier" than others (e.g., when triggered, they stay on for longer periods of time), some alert types are more critical than others, and so forth.

For each alert class (A-D), an interrupt can be sent. Like the interrupts sent from "standard" peripheral devices, there can be a triad of registers—e.g., enable, status, and test—for those interrupts sent by the alert handler 110. Thus, like other interrupts, software executing on the processor may be able to handle the source of the interrupt (e.g., the original alert event detected by a peripheral device 250 in this case) and then clear the register state. Because the interrupt class is disassociated from the original alert (due to the classification 404 process), software can be granted access to cause registers to determine which alerts have fired since the last clearing.

Issuance of each of the four class-based interrupts can optionally trigger a timeout counter (e.g., which may be physically the same counter as used for a corresponding escalation timer 308) that triggers further escalation if the interrupt is not handled and cleared within a certain time frame, as described herein. In some cases, interrupts can be configured to fire once an alert has been registered in the corresponding alert classification. In other words, interrupts can be independent of escalation mechanisms like alert accumulation counters or escalation timers as described herein.

Regarding escalation mechanisms, in some implementations, there are at least two mechanisms per class that can trigger the corresponding escalation protocol—e.g., the implementation of a corresponding security countermeasure per escalation severity level. A first mechanism involves an accumulation unit 306 with a counter that counts a quantity of alert occurrences within a particular alert classification. An alert classified into class A means that on each received triggered alert 362, the accumulation counter for class A is incremented. To simplify the hardware, because alerts are expected to be rare or to never occur, the alert handler 110 need not attempt to count every alert per clock cycle. Instead, in some cases, the alert triggers per-class are OR'd together before sending the OR'd result to the accumulation counter as an increment signal at the accumulation unit 306. Once the corresponding alert quantity threshold has been reached, the next occurrence can trigger the escalation protocol for the given class. The counter can be realized with, for instance, a saturation counter so that it does not wrap around once it reaches the maximum representable count.

The alert-counting accumulation mechanism can be associated with two control and status registers (CSRs) per classification. The first register is for an accumulation maximum value. This represents a total number of triggered alerts (e.g., a sum of the alerts classified in the corresponding group) to be reached to enter an escalation phase. This value is also referred to herein as an alert quantity threshold. The second register is a current accumulation register. This clearable register indicates how many alerts have been accumulated to date. Software is expected to clear this register before it reaches the maximum accumulation threshold setting if escalation is to be avoided.

A second escalation mechanism involves escalation timer circuitry (e.g., in an escalation timer 308) with an interrupt timeout counter, or timer, that triggers escalation if an alert interrupt is not handled within the programmable timeout window. Once the timeout counter hits a timeout threshold (e.g., climbs up to a particular positive value or counts down to zero), the escalation protocol is triggered. The interrupt timeout escalation mechanism can also be associated with two CSRs per classification. The first register is to set an interrupt timeout value, which can have units of clock cycles. The interrupt timeout can be disabled if this register is set to zero. The second register is for the current interrupt timeout value, which counts up or down. This timer register can be readable. Software is expected to clear a corresponding interrupt state bit for the given classification before the timeout if escalation is to be avoided. In some cases, a single physical counter per classification can be employed for both the interrupt timeout feature and the escalation phase timer. This circuitry-reducing strategy can be implemented if the interrupt timeout periods and the escalation phases are nonoverlapping (e.g., with escalation taking precedence should it be triggered).

Regarding programmable escalation protocols, in some implementations, with an example four levels of escalation severity 426-1 to 426-4, there are four output escalation signals—0, 1, 2, and 3. Examples of escalation signals or security countermeasures that are precipitated by such escalation signals include, but are not limited to, a processor non-maskable interrupt (NMI), privilege lowering, secret wiping, chip resetting, and so forth. In some cases, a hierarchical order across escalation severity can range from escalation level 0 as the first to trigger, followed by escalation levels 1, 2, and then 3. The system operation can emulate a "fuse" in that an alert handling path continues once the first escalation level is triggered, absent affirmative intervention—e.g., by the processor clearing an interrupt, resetting a bit in a register, and the like.

Each respective class can be programmed with a respective escalation protocol. If one of the two mechanisms described above fires (e.g., the counter accumulation mechanism or the escalation timer mechanism), another timer for the corresponding class is started. The timer can be programmed with up to X delays using one or more registers. Each of the X delays represents a distinct escalation phase (0-3) (e.g., where X=4). Each of the four escalation severity outputs (0-3) are by "default" configured to be asserted during the corresponding phase. In other words, the severity output 0 is asserted in phase 0, the output severity 1 is asserted in phase 1, and so forth. However, this mapping can be reassigned away from the default by modifying the corresponding enable/phase mappings using one or more registers 424. This mapping can be locked in together with the alert-enable settings after the initial configuration is established.

Software can stop a triggered escalation protocol by, for instance, clearing the corresponding escalation counter. Protection of this clearing operation may be vested in the software. Each of the escalation phases has a duration of at least one clock cycle, even if the cycle count of a particular phase has been set to zero.

The following example pertains to the accumulation of alerts until the escalation protocol is eventually engaged. The first alert triggers an interrupt to class A. It is given that the processor is wedged or taken over, in which case the processor does not handle the interrupt. Once enough alerts have been gathered (e.g., 16), the first escalation phase is entered. The first escalation phase is followed by three more escalation phases, with each respective escalation phase having its own programmable length using at least one respective register. Here, the accumulator alert quantity threshold is set to 15 in order to trigger on the 16th alert occurrence. If escalation is to be triggered on the first occurrence within an alert classification, the alert quantity threshold is set to zero. Also, the circuitry may take a clock cycle to trigger the next escalation mechanism and enter phase 0.

In another example, an interrupt remains unhandled by the processor. Thus, the interrupt timeout counter triggers escalation when the interrupt handling timer expires. Each of the four escalation severity phases can be entered after each respective timer expires, assuming that the alert is not cleared. For each escalation phase, an escalation sender module communicates with an escalation receiver module of an escalation handler. As is described below with reference to FIG. 7, the applicable differential escalation signaling protocol can distinguish "true" escalation conditions from mere ping signaling by encoding the escalate commands as pulses that are K+1 cycles long, where K is a positive integer.

Figures 1, 5:
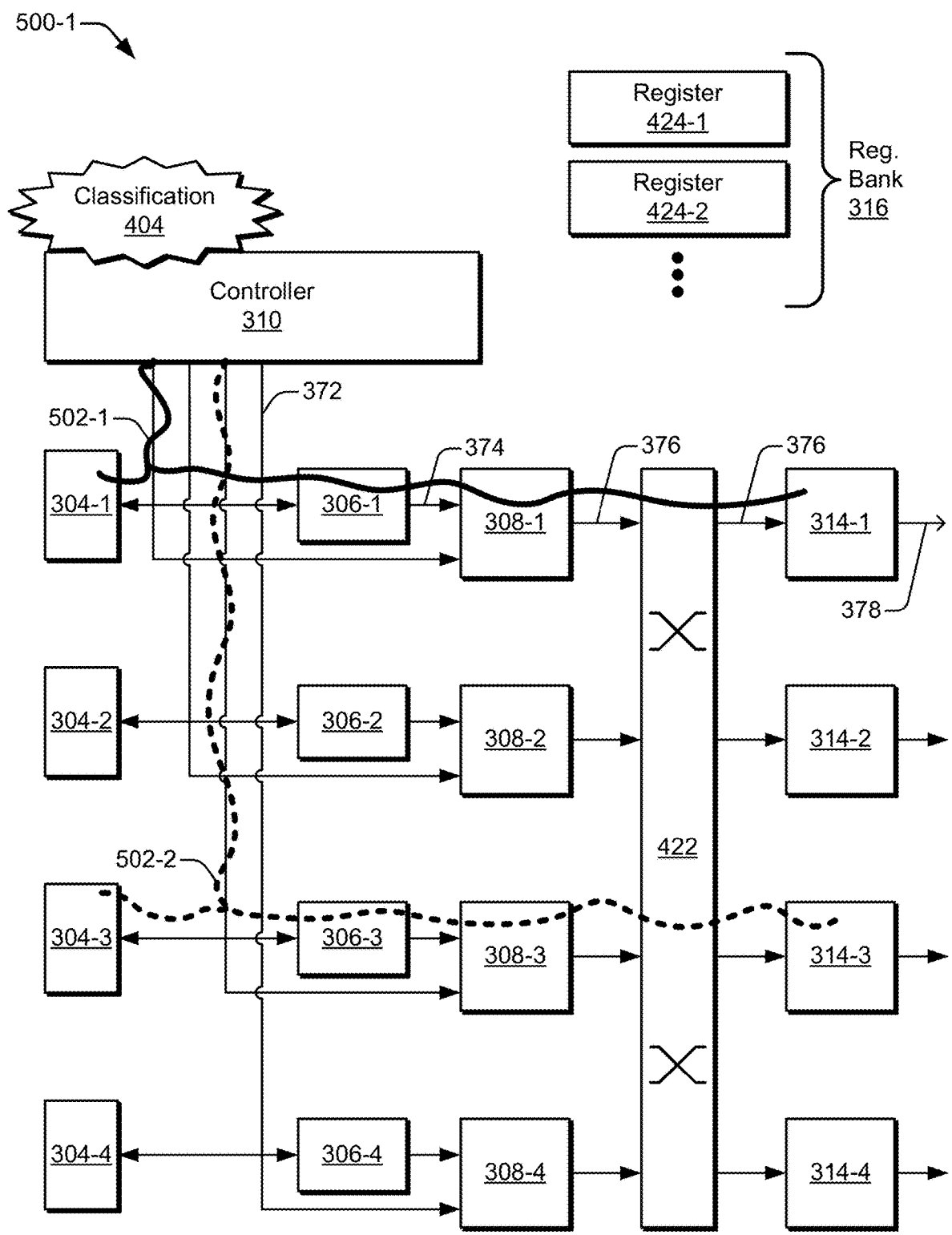
Figures 2, 5:
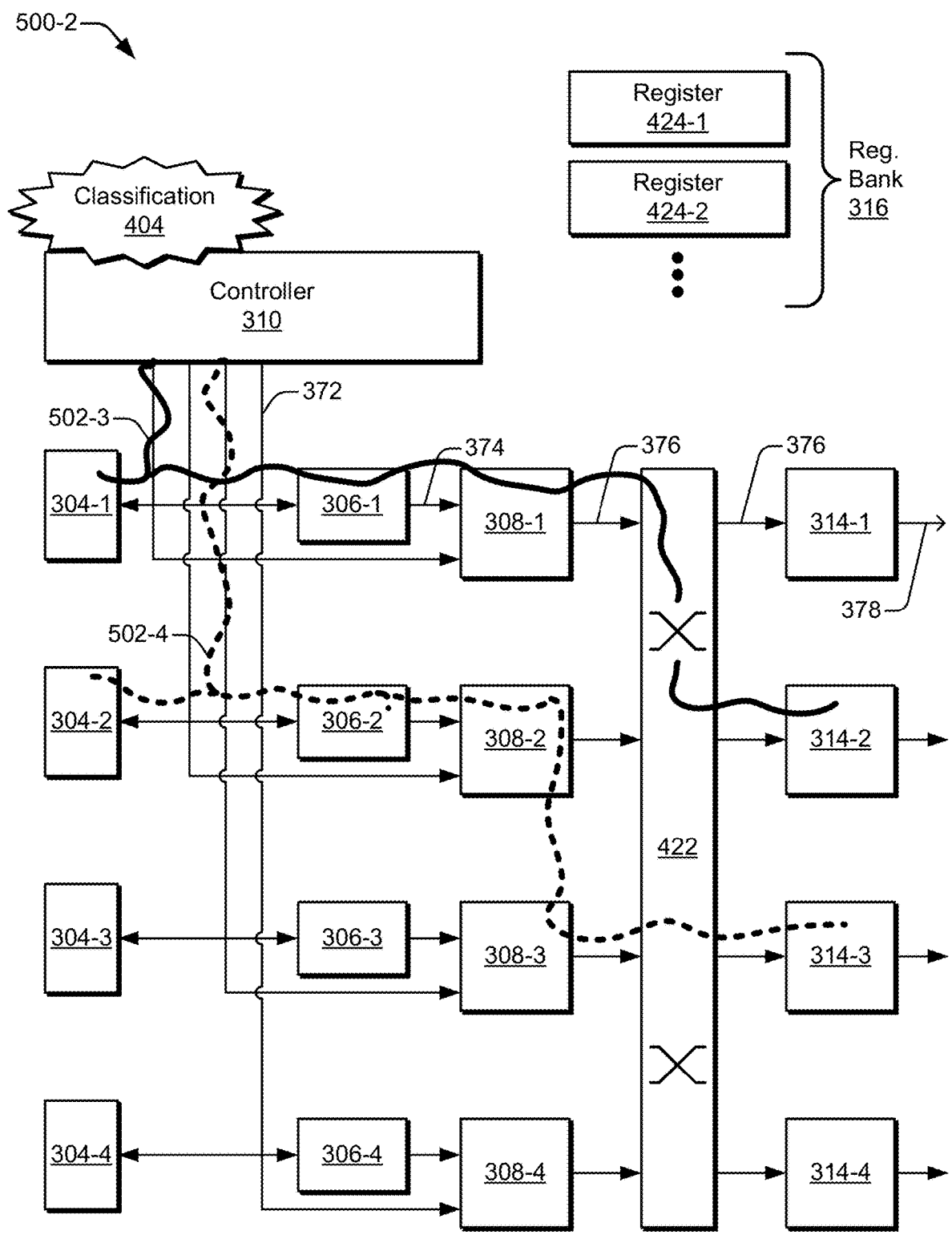
Figures 3, 5:
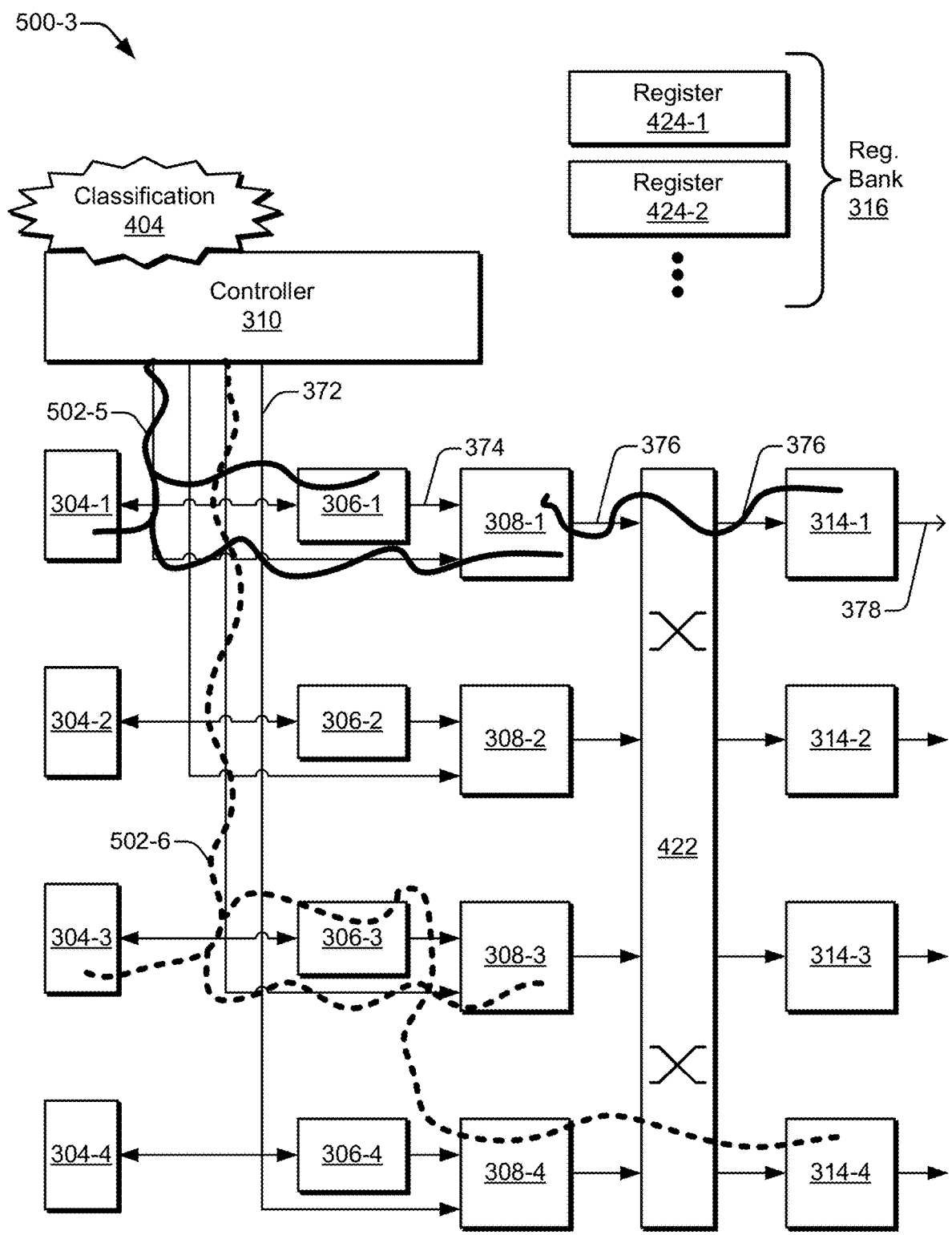

FIGS. 5-1 to 5-3 illustrate example alert handling paths 502-1 to 502-6 that extend within an alert handler 110. The alert handling paths are presented in an example alert handler architecture with four levels of both alert classifications 406 and escalation severity 426. The principles are, however, relevant to other architectures. The various example alert handling paths 502 can be established using the registers 424 of the register bank 316. Also, although not shown in the drawings, each alert handling path 502 can progress to higher levels of escalation severity if lower levels (e.g., an initial classification level) do not result in the alert being cleared.

At 500-1 generally in FIG. 5-1, a first alert handling path 502-1 relates to an alert that is classified into a first alert classification level. Accordingly, the first IRQ unit 304-1 transmits an interrupt to the processor. The controller 310 also increments a count of the first accumulation unit 306-1 and can initiate a timer of the first escalation timer 308-1. Responsive to the count reaching an alert quantity threshold for the first classification level or the initiated timer expiring (e.g., after an interrupt timer has also expired), the first escalation timer 308-1 issues an escalation instruction 376 to the first escalation sender module 314-1.

A second alert handling path 502-2 relates to an alert that is classified into a third alert classification level. In this case, the components corresponding to the first and second classification levels are skipped along the hierarchy of increasing escalation severity. Accordingly, the third IRQ unit 304-3 transmits an interrupt to the processor. The controller 310 also increments a count of the third accumulation unit 306-3 and can initiate a timer of the third escalation timer 308-3 (e.g., after an interrupt timer expires). If the processor clears the interrupt, the alert handling can be terminated. Otherwise, responsive to the count reaching an alert quantity threshold for the third classification level or the initiated timer expiring, the alert handler 110 (e.g., the third escalation timer 308-3) issues an escalation instruction 376 to the third escalation sender module 314-3.

With the first and second alert handling paths 502-1 and 502-2, each path is "confined" to the components corresponding to a given escalation severity 426. However, other alert handling paths may traverse components of multiple escalation severities 426. At 500-2 generally in FIG. 5-2, a third alert handling path 502-3 and a fourth alert handling path 502-4 both traverse components of two different classification levels as the paths are routed along a hierarchy of increasing escalation severity.

The third alert handling path 502-3 relates to an alert that is classified into the first alert classification level, like the first alert handling path 502-1. A difference between the first and third alert handling paths 502-1 and 502-3 arises at the point an escalation instruction 376 is issued. For the third alert handling path 502-3, the first escalation timer 308-1 issues an escalation instruction 376 to the second escalation sender module 314-2 using the switch matrix 422, instead of issuing to the first escalation sender module 314-1. Thus, the third alert handling path 502-3 processes a given triggered alert 362 (e.g., of FIGS. 3 and 4-1) using the interrupt, count threshold, and timer duration of the circuitry for the first escalation severity 426-1 (e.g., of FIG. 4-1). The security countermeasure that is implemented for the third alert handling path 502-3, however, corresponds to that of the second escalation severity 426-2.

Thus, the processing of two alerts that are both classified into the first alert classification level may differ from each other. The deviation between the two alert handling paths 502 may be controlled by at least one register 424 based on an origin of the triggered alert—e.g., the alert receiver module 312 or the alert sender module 322 of a peripheral device 250. The fourth alert handling path 502-4 relates to an alert that is classified into the second alert classification level. At expiration of a time period of the second escalation timer 308-2, an escalation instruction 376 is not yet issued. Instead, the fourth alert handling path 502-4 is routed to a third escalation timer 308-3. At expiration of a time period of the third escalation timer 308-3, the third escalation timer 308-3 issues an escalation instruction 376 to the third escalation sender module 314-3. The third escalation sender module 314-3 then transmits an escalate command 378 in accordance with a third escalation severity 426-3.

At 500-3 generally in FIG. 5-3, additional adaptive features are shown to depict how the alert handling paths 502 can be flexibly implemented. At a fifth alert handling path 502-5, the path branches. Either of two conditions can trigger issuance of an escalation instruction 376 to an escalation sender module 314. A count value is tracked by the first accumulation unit 306-1. A timer is also monitored by the first escalation timer 308-1. Both conditions—either sequentially or partially overlapping—need not be met to trigger the escalation instruction. Instead, if the count meets the alert quantity threshold for the first escalation severity 426-1 (as determined by the first accumulation unit 306-1) or if the timer for the first escalation severity 426-1 expires (as determined by the first escalation timer 308-1), the alert handler 110 (e.g., the first escalation timer 308-1) issues the escalation instruction 376 to the first escalation sender module 314-1 via the switch matrix 422.

A sixth alert handling path 502-6 depicts an example conditional branching between levels of escalation severity 426. A triggered alert 362 is classified into a third level. The third IRQ unit 304-3 issues an interrupt, and the third escalation timer 308-3 starts a timer immediately or after the interrupt timeout expires. The third accumulation unit 306-3 also continues or begins accumulating alerts classified into the third level. If the escalation timer expires first, the third escalation timer 308-3 issues an escalation instruction at the third level of escalation severity 426-3. If, however, alerts are incoming at such a rate as to meet the alert quantity threshold for the third level before the escalation timer expires, the sixth alert handling path 502-6 is routed to a higher escalation severity level, namely the fourth escalation severity 426-4 in this example. Thus, the fourth escalation timer 308-4 initiates a timer duration for the fourth level, which may be appreciably shorter than one for the third level. If the escalation timer on the fourth level expires first, then the fourth escalation timer 308-4 issues an escalation instruction 376 to the fourth escalation sender module 314-4, as shown. If, on the other hand, the timer of the third escalation timer 308-3 expires first, the third escalation timer 308-3 can issue an escalation instruction instead to the third escalation sender module 314-3 (not explicitly shown). In other words, the alert handler 110 is configured to escalate an apparent third-level class alert to a fourth-level security countermeasure if numerous alerts arrive very quickly. Otherwise, the third level classification can result in performance of a third-level security countermeasure for the sixth alert handling path 502-6.

Figure 6:
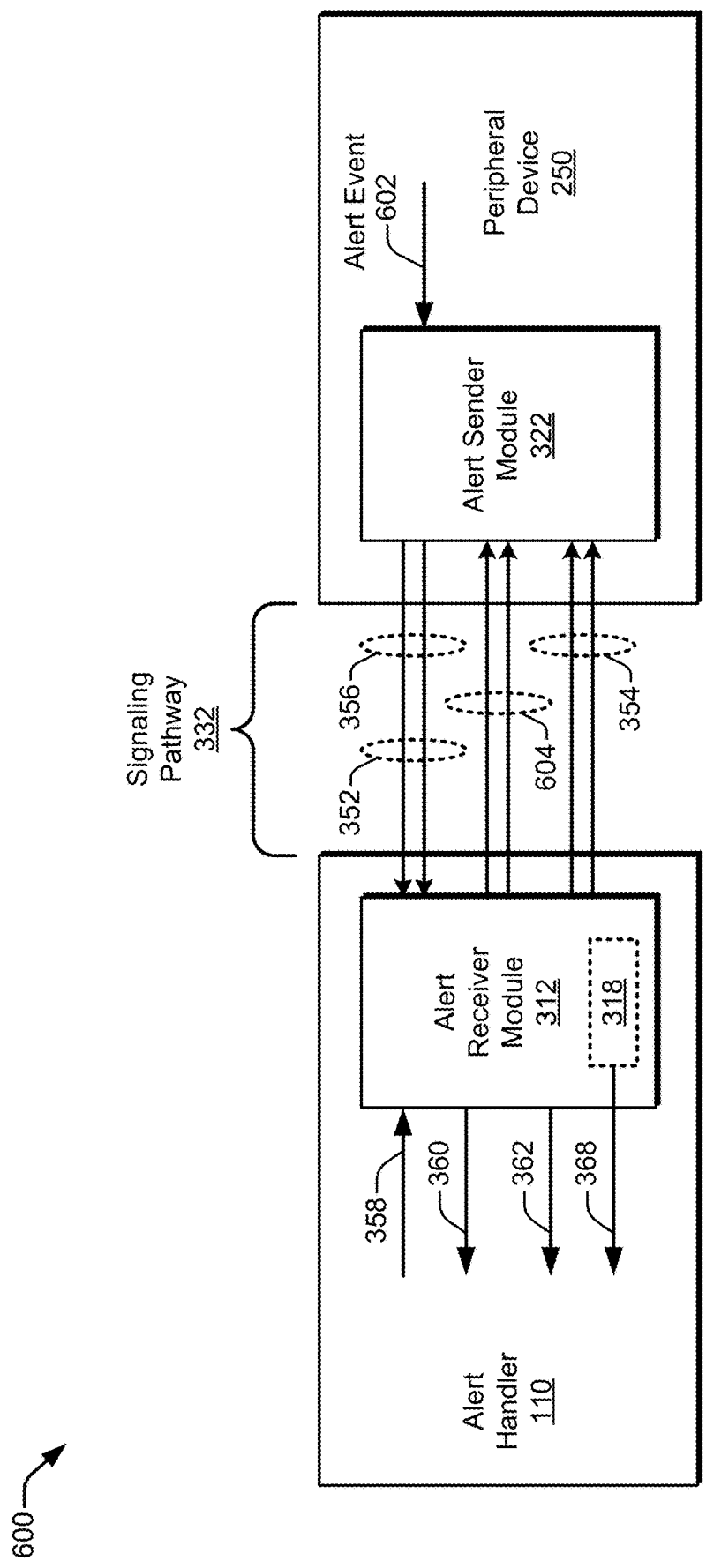
FIG. 6 illustrates an example communication relationship between an alert receiver module of an alert handler and an alert sender module of a peripheral device.

FIG. 6 illustrates an example communication relationship 600 between an alert receiver module 312 of an alert handler 110 and an alert sender module 322 of a peripheral device 250. As shown, the signaling pathway 332 includes multiple pairs of wires (e.g., three pairs) to enable differential signaling across three differential paths. Each pair of wires includes a plus wire and a minus wire. The modules can communicate synchronously or asynchronously across the signaling pathway 332.

In example implementations, the peripheral device 250 detects an alert event 602. The alert event 602 may correspond to a sensor input (e.g., a sensed parameter by a sensor), an observed pattern of activity, an indication received from another component, and so forth. In response to the alert event signal 602, the alert sender module 322 transmits an alert indication 352 to the alert receiver module 312 on a first pair of wires (e.g., the upper pair as depicted). Responsive to receiving the alert indication 352, the alert receiver module 312 provides a triggered alert 362 to a controller 310. The alert receiver module 312 also transmits an alert acknowledgment signal 604 back to the alert sender module 322 on a second pair of wires (e.g., the middle pair as depicted) to confirm receipt of the alert indication signal 352.

For a pinging protocol, the alert receiver module 312 receives a ping instruction 358 from a ping monitor 302 (e.g., of FIGS. 3 and 4-1). Prompted by the ping instruction 358, the alert receiver module 312 transmits a ping request 354 to the alert sender module 322 on a third pair of wires (e.g., the lower pair as depicted). To indicate that the connection to the peripheral device 250 is live and functional, the alert sender module 322 transmits a ping response 356 back to the alert receiver module 312—e.g., on the first pair of wires. For resiliency, the alert sender module 322 can transmit the alert indication 352 and the ping response 356 on the same pair of wires. This ensures that a bad actor has not cut the wires for the alert indication 352 while leaving intact the wires for the ping response 356. The alert receiver module 312 receives the ping response 356 from the alert sender module 322. To complete the ping protocol loop, the alert receiver module 312 forwards a ping okay message 360 to the ping monitor 302 responsive to receipt of the ping response 356.

In some cases, at least a portion of the integrity failure circuitry 318 is coupled to or incorporated into the alert receiver module 312. This integrity failure circuitry 318 monitors at least one pair of wires to determine if proper differential signaling is extant on the differential path and that expected signaling patterns match actual signaling patterns. If not, the integrity failure circuitry 318 generates an alert integrity failure signal 368 and provides this signal to the controller 310 as an internal alert of the alert handler 110 (e.g., as shown in FIG. 3).

In some implementations, alerts are encoded differentially and signaled using a "full" handshake on the plus/minus alert indication wires (e.g., the first pair of wires) and the plus/minus alert acknowledgment wires (e.g., the second pair of wires). Employing a full handshake protocol allows the alert signaling mechanism to be used with an asynchronous clocking strategy in which some peripheral devices may reside in a different clock domain 410 than the alert handler 110. The full handshake protocol ensures that alert messages are correctly back pressured and that no alert is "lost" at the asynchronous boundary due to (possibly variable) clock ratios greater or less than 1.0. The native alert indication can be repeated on the differential alert indication wires if the alert event 602 is still true within the peripheral device 250. The handshake pattern can thus be repeated while the alert is true. The alert sender module 322 can wait for two cycles between handshakes.

In an asynchronous environment, the alert indication 352 can be "immediately" propagated to the triggered alert signal 362 once the initial level change on the alert indication wires has been received and synchronized to the local clock at the alert receiver module 312. This ensures that the first occurrence of an alert indication 352 is propagated, even if the handshake lines have been manipulated to emulate backpressure. In a scenario with emulated backpressure, subsequent alert indications may be back pressured; however, the ping testing mechanism described herein eventually detects that a bad actor has tampered with the wires.

In some implementations, to ensure that the alert sender modules 322 have not been compromised, the alert receiver modules 312 "ping" or line-test the senders periodically (e.g., every few microseconds) with ping or heartbeat messages. Ping timing can be randomized so the appearance of ping request 354 messages cannot be predicted. The ping timing is generated by a central LFSR-based timer within the alert handler 110 (e.g., using a ping timer 402 of the ping monitor 302) that randomly asserts the ping instruction signal 358 of a particular alert receiver module 312.

Once the ping instruction signal 358 is asserted, the alert receiver module 312 encodes a ping request message 354 as a level change on the ping requesting differential path (e.g., the third pair of wires). The alert receiver module 312 waits until the alert sender module 322 responds with a full handshake on the plus/minus alert indication wires (e.g., the first pair of wires) and the plus/minus acknowledgment wires (e.g., the second pair of wires). Once that handshake is complete, the alert receiver module 312 asserts the ping okay message 360. The LFSR-based timer can have a programmable ping timeout. After expiration of the programmable ping timer without an occurrence of a full handshake, the ping monitor 302 asserts a "ping fail" internal alert using an alert ping failure signal 364. That timeout can be a function of the clock ratios present in the system and can be programmed accordingly at system startup.

In the relatively unlikely case that a ping request 354 collides with a native alert indication 352 at an alert sender module 322, the alert indication 352 is held back until the ping handshake protocol is completed. Although this approach slightly delays the transmission of the alert indication 352, the alert indication 352 is eventually signaled. Further, if an alert indication 352 is sent out from the alert sender module 322 right before a ping request 354 arrives at the alert sender module 322, the alert receiver module 312 treats the alert indication 352 as a ping response. The "true" ping response is still returned just after the alert handshake is completed, so the alert is signaled with only a slight delay, and the alert receiver module 312 interprets it as such. In both collision cases, the signaling delay is on the order of the handshake length, plus the constant amount of pause cycles between handshakes (e.g., two sender cycles).

In some implementations, differential pairs are monitored for signal integrity issues by the integrity failure circuitry 318. If an encoding failure is detected, the alert receiver module 312 asserts an alert integrity failure signal 368. This can occur in at least the following failure cases: First, the alert indication differential path (e.g., the first pair of wires) may not be correctly encoded at the alert receiver module 312. This can be directly flagged as an integrity failure on the receiver side. Second, either the acknowledgment differential path (e.g., the second pair of wires) or the ping request differential path (e.g., the third pair of wires) may not be correctly encoded at the alert sender module 322. Either of these latter two failures can be signaled to the alert receiver module 312 by having the alert sender module 322 set both the plus and minus alert indication wires to the same value. Further, the alert sender module 322 can continuously toggle that value. This implicitly triggers a signal integrity alert at the alert receiver module 312. Several signaling patterns can represent a failure. For example, if the plus and minus lines of a differential pair both have a low voltage or both have a high voltage simultaneously, then a failure is observed.

Figure 7:
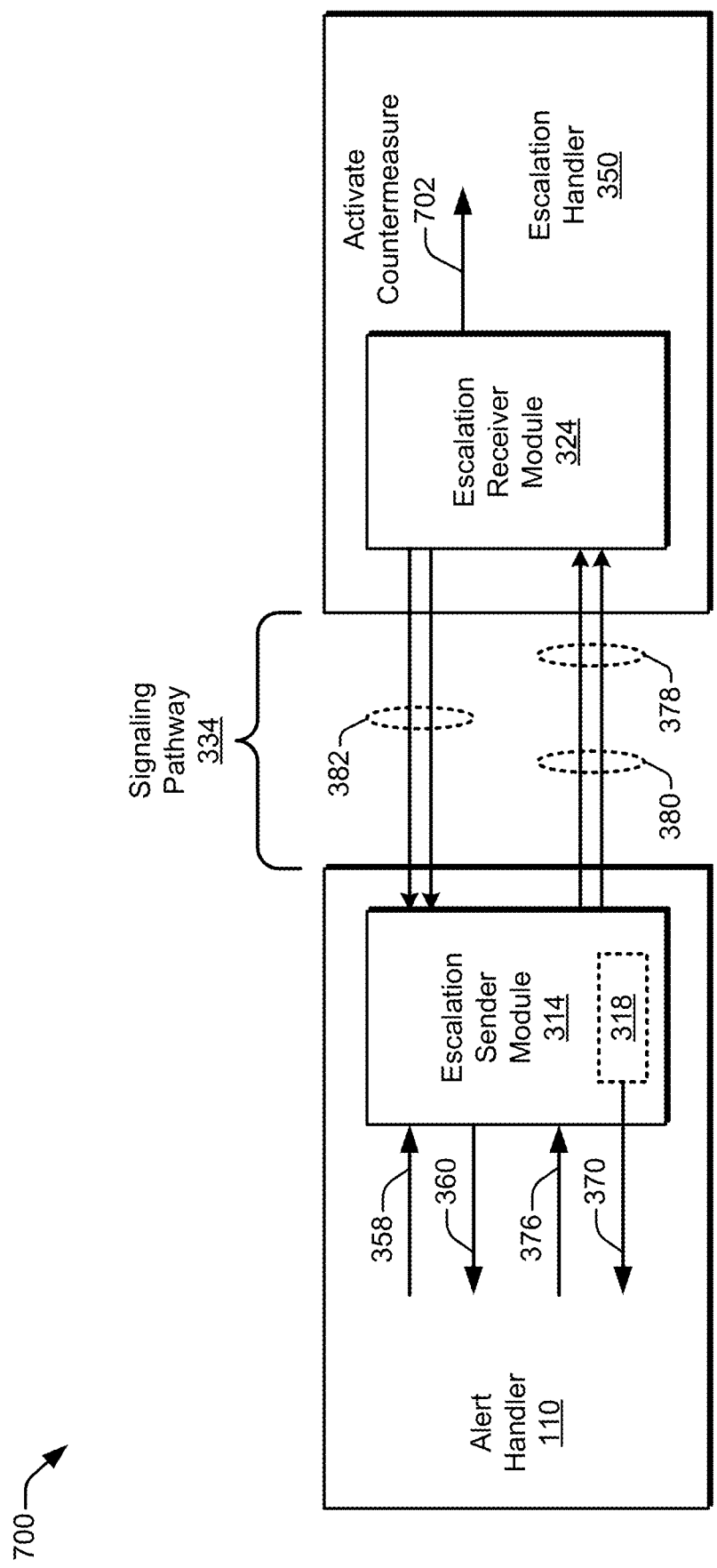
FIG. 7 illustrates an example communication relationship between an escalation sender module of an alert handler and an escalation receiver module of an escalation handler.

FIG. 7 illustrates an example communication relationship 700 between an escalation sender module 314 of an alert handler 110 and an escalation receiver module 324 of an escalation handler 350. As shown, the signaling pathway 334 includes multiple pairs of wires (e.g., two pairs) to enable differential signaling across two differential paths. Each pair of wires includes a plus wire and a minus wire. The modules can communicate at least synchronously across the signaling pathway 334. In example implementations, the escalation handler 350 performs or at least starts a security countermeasure based on an activate countermeasure instruction 702.

As part of an alert handling path 502 (e.g., of FIGS. 5-1 to 5-3), an escalation timer 308 (e.g., also of FIG. 3) provides an escalation instruction 376 to the escalation sender module 314. In response to receiving the escalation instruction 376, the escalation sender module 314 transmits an escalate command 378 to the escalation receiver module 324 on a second pair of wires (e.g., the lower pair as depicted). Responsive to receiving the escalate command 378, the escalation receiver module 324 generates the activate countermeasure indication 702. Accordingly, the escalation handler 350 at least initiates performance of a security countermeasure as described herein in response to the transmitted escalate command 378.

For a pinging protocol, the escalation sender module 314 receives a ping instruction 358 from a ping monitor 302 (e.g., of FIGS. 3 and 4-1). Prompted by the ping instruction 358, the escalation sender module 314 transmits a ping request 380 to the escalation receiver module 324 on the second pair of wires. To indicate that the connection to the escalation handler 350 is live and functional, the escalation receiver module 324 transmits a ping response 382 back to the escalation sender module 314 on a first pair of wires (e.g., the upper pair as depicted). The escalation sender module 314 receives the ping response 382 from the escalation receiver module 324. To complete the ping protocol loop, the escalation sender module 314 forwards a ping okay message 360 to the ping monitor 302 responsive to receipt of the ping response 382.

In some cases, at least a portion of the integrity failure circuitry 318 is coupled to or incorporated into the escalation sender module 314. This integrity failure circuitry 318 monitors at least one pair of wires to determine if proper differential signaling is extant on the differential path and that expected signaling patterns match actual signaling patterns. If not, the integrity failure circuitry 318 generates an escalation integrity failure signal 370 and provides this signal to the controller 310 as an internal alert of the alert handler 110.

It is possible that a bad actor attacks the alert handler 110 directly. If the alert handler 110 is wedged or otherwise compromised during a tampering attempt, the escalation sender module 314 may cease periodically sending ping requests 380. As another defense mechanism, the escalation handler 350, such as the escalation receiver module 324 thereof, can include ping verification circuitry (not shown) to monitor incoming ping requests 380 and respond with a countermeasure if the pings cease. The ping verification circuitry can include, for instance, a timeout counter. In such an instance, the ping verification circuitry resets the timeout counter each time the escalation receiver module 324 receives a ping request 380. Thus, if one or more pings are absent for a time period that exceeds a length of the timeout counter, it is possible that an attack is occurring on the alert handler 110. To combat the detected attack, or the inferred potential attack, the ping verification circuitry causes an escalation by issuing the activate countermeasure indication 702 to trigger the corresponding countermeasure responsive to the timer expiring.

In some implementations, for each of S escalation severities 426 (where S represents a positive integer, like four), the alert handler 110 instantiates an escalation sender module 314. The S escalation handlers 350 each instantiate a corresponding escalation receiver module 324. The escalation signaling mechanism is similar to the alert signaling mechanism. The escalation signaling mechanism, however, can be a fully synchronous protocol if the escalation handlers 350 are in the same clock domain as the alert handler 110. To facilitate the synchronous communication, the escalation sender modules 314 and the escalation receiver modules 324 can use the same clock and reset signals.

As shown in FIG. 7, each sender-receiver pair is connected with two differential line pairs. One pair extends from the sender to the receiver, and the other pair extends from the receiver to the sender. Upon receiving an escalation instruction signal 376 having a pulse width of K>0, the escalation sender module 314 encodes that signal as a differential pulse of width (K+1) on the differential path for the ping request 380 (e.g., on the second pair of wires). The escalation receiver module 324 decodes that message and asserts the activate countermeasure 702 output after one cycle of delay. Further, the escalation receiver module 324 acknowledges receipt of that message by continuously toggling the plus/minus signals on the first pair of wires as long as the escalate command 378 is asserted. A failure by the escalation receiver module 324 to respond correctly triggers an escalation integrity failure signal 370 from the integrity failure circuitry 318.

Further, a differential signaling mismatch on either of the pairs of wires also triggers an alert for an escalation integrity failure 370. Mismatches on the first pair of wires for the ping responses and the acknowledgments can be directly detected at the escalation sender module 314. Mismatches on the second pair of wires for the escalate commands and the ping requests are signaled back to the escalation sender module 314 by the escalation receiver module 324. To do so, the escalation receiver module 324 sets both the plus and minus response wires of the first pair of wires to the same value and toggles that value each clock cycle. This implicitly triggers an escalation signal integrity alert on the sender side. This back-signaling mechanism can be leveraged to fast-track escalation and use another countermeasure in case the alert handler 110 detects that a particular escalation signaling path has been tampered with.

In some implementations, ping testing of the escalation handlers is similar to that for the alert signaling scheme. The escalation signaling lines can be pinged and/or line tested in order to determine whether the escalation receiver module 324 has been tampered with. This can be achieved by asserting the input for the ping instruction 358 at the escalation sender module 314. A ping request 380 is encoded as a single cycle pulse on the second pair of wires, which are also used for transmission of the escalate command 378. With the single cycle pulse for the ping request 380, however, the escalation receiver module 324 does not decode this signaling as an escalate command. Instead, the escalation receiver module 324 responds with a "1010" pattern on the first pair of wires to communicate the ping response 382.

In response, the escalation sender module 314 asserts the ping okay message 360 if that pattern is received correctly after one cycle of latency. Otherwise, the escalation sender module 314 first asserts the escalation integrity failure signal 370 to notify the controller 310. Later, after the programmable ping timeout is reached, the ping monitor 302 raises a "ping fail" alert using the escalation ping failure signal 366. The escalation sender module 314 triggers the escalation integrity failure signal 370 in this case because "no ping response" and "wrong ping response" are ambiguous in this context.

Further, in this escalation and countermeasure context, the escalation signal takes precedence over ping messaging. Accordingly, a ping instruction 358 is acknowledged with a ping okay message 360 if the escalation instruction 376 is already asserted. An ongoing ping sequence is also aborted if the escalation instruction 376 becomes asserted. In some cases, the ping and escalation response sequences are expected to start one cycle after either a ping request or an escalate command has been signaled. Otherwise, the escalation sender module 314 asserts the escalation integrity failure signal 370.

Having generally described schemes, techniques, and hardware for alert handling, this discussion now turns to example methods.

Example Methods for Alert Handling

Figure 8:
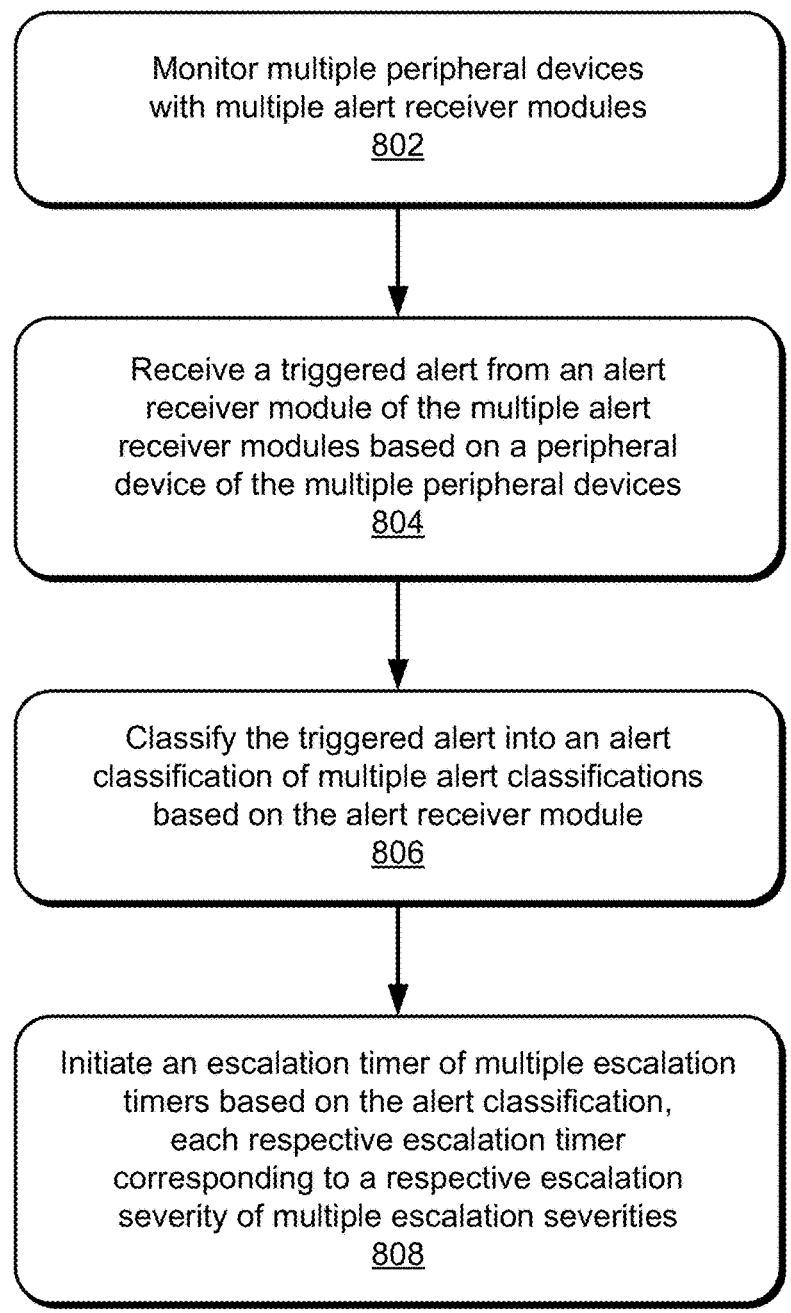
FIG. 8 illustrates example methods for an apparatus to implement alert handling.

Example methods are described below with reference to a flow diagram of FIG. 8. FIG. 8 illustrates, with the flow diagram 800, example methods for an apparatus to implement alert handling. The flow diagram 800 includes four blocks 802-810. At block 802, multiple peripheral devices are monitored with multiple alert receiver modules. For example, an alert handler 110 can monitor multiple peripheral devices 250-1 . . . 250-P with multiple alert receiver modules 312-1 . . . 312-M. As part of the monitoring, an alert receiver module 312 may monitor a signaling pathway 332 to receive an alert indication 352, by implementing a pinging message protocol, or by checking for wire and signaling integrity.

At block 804, a triggered alert is received from an alert receiver module of the multiple alert receiver modules based on a peripheral device of the multiple peripheral devices. For example, the alert handler 110 can receive a triggered alert 362 from the alert receiver module 312 of the multiple alert receiver modules 312-1 . . . 312-M based on a peripheral device 250 of the multiple peripheral devices 250-1 . . . 250-P. A controller 310 of the alert handler 110 may, for instance, receive the triggered alert 362 from the alert receiver module 312. The controller 310 may at least implicitly identify the alert-originating alert sender module 322 to determine the nature of the alert based on the transmitting alert receiver module 312.

At block 806, the triggered alert is classified into an alert classification of multiple alert classifications based on the alert receiver module. For example, the alert handler 110 can classify the triggered alert 362 into an alert classification 406 of multiple alert classifications 406-1 . . . 406-N based on the alert receiver module 312 that provided the triggered alert 362. In some cases, the controller 310 may perform a classification 404 using at least one register 424 of a register bank 316. A value stored in the register 424 may link the peripheral device 250 or an alert event 602 thereof to a corresponding alert classification 406. A level of the determined alert classification 406 may establish an initial escalation severity 426.

At block 808, an escalation timer of multiple escalation timers is initiated based on the alert classification, with each respective escalation timer corresponding to a respective escalation severity of multiple escalation severities. For example, the alert handler 110 can initiate an escalation timer 308 of multiple escalation timers 308-1 . . . 308-N based on the alert classification 406, with each respective escalation timer 308 corresponding to a respective escalation severity 426 of multiple escalation severities 426-1 . . . 426-S. A length of a timer duration for the initiated timer may be established by at least one register 424 for the corresponding alert classification 406. The escalation timer 308 may be initiated upon receipt of the triggered alert 362, after an interrupt timer corresponding to an IRQ unit 304 expires, responsive to an accumulating counter of an accumulation unit 306 reaching an alert quantity threshold, some combination thereof, and so forth.

Aspects of these methods may be implemented in, for example, hardware (e.g., fixed logic circuitry or a processor in conjunction with a memory), firmware, or some combination thereof. The methods may be realized using one or more of the apparatuses or components shown in FIGS. 1 to 7, which components may be further divided, combined, and so on. The devices and components of these figures generally represent hardware, such as electronic devices, PCBs, packaged modules, IC chips, components, or circuits; firmware; or a combination thereof. Thus, these figures illustrate some of the many possible systems or apparatuses capable of implementing the described methods.

For the methods described herein and the associated flow diagram(s), the orders in which operations are shown and/or described are not intended to be construed as a limitation. Instead, any number or combination of the described method operations can be combined in any order to implement a given method, or an alternative method. Operations may also be omitted from or added to the described methods. Further, described operations can be implemented in fully or partially overlapping manners.

ADDITIONAL EXAMPLES

In the following, some examples are described.

Example 1: An integrated circuit comprising: multiple peripheral devices; and an alert handler comprising: multiple alert receiver modules, each alert receiver module coupled to a peripheral device of the multiple peripheral devices; multiple escalation timers, each respective escalation timer corresponding to a respective escalation severity of multiple escalation severities; and a controller coupled to the multiple alert receiver modules and the multiple escalation timers, the controller configured to: classify a triggered alert received from an alert receiver module of the multiple alert receiver modules into an alert classification of multiple alert classifications based on at least one of the alert receiver module or the triggered alert; and initiate an escalation timer of the multiple escalation timers based on the alert classification.

Example 2: The integrated circuit of example 1, further comprising: an interconnect; and a processor coupled to the alert handler via the interconnect, wherein the controller of the alert handler is configured to: generate an interrupt based on the triggered alert; issue the interrupt to the processor; await expiration of the escalation timer; and responsive to failing to receive from the processor a response to the interrupt, escalate the triggered alert beyond the escalation timer.

Example 3: The integrated circuit of example 1 or 2, wherein the controller of the alert handler is configured to escalate the triggered alert beyond the escalation timer by at least one of: issuing another interrupt to the processor, the other interrupt corresponding to a higher interrupt level than that of the interrupt; initiating another escalation timer of the multiple escalation timers, the other escalation timer corresponding to a higher escalation severity of the multiple escalation seventies than that of the escalation timer; or instructing an escalation sender module to send an escalate command to an escalation handler.

Example 4: The integrated circuit of any of the preceding examples, wherein the alert handler is configured, responsive to expiration of the escalation timer, to selectively escalate the triggered alert by at least one of: stepping to a next escalation timer of the multiple escalation timers along a hierarchy of increasing escalation severity; or skipping the next escalation timer along the hierarchy of increasing escalation severity to another escalation timer of the multiple escalation timers.

Example 5: The integrated circuit of any of the preceding examples, further comprising: multiple escalation handlers, each escalation handler configured to implement at least one security countermeasure, wherein: the alert handler comprises multiple escalation sender modules, each escalation sender module coupled to an escalation handler of the multiple escalation handlers; and the multiple escalation timers are coupled to the multiple escalation sender modules.

Example 6: The integrated circuit of any of the preceding examples, wherein: the alert handler comprises at least one of a switch matrix or a set of multiplexers; and at least a portion of the multiple escalation timers are selectively coupled to multiple ones of the multiple escalation sender modules via the switch matrix or the set of multiplexers.

Example 7: The integrated circuit of any of the preceding examples, wherein the alert handler is configured, responsive to expiration of the escalation timer, to selectively escalate the triggered alert by at least one of: instructing an escalation sender module of the multiple escalation sender modules to transmit an escalate command to an escalation handler of the multiple escalation handlers, the escalation sender module having an escalation severity that corresponds to that of the escalation timer; or instructing another escalation sender module of the multiple escalation sender modules to send an escalate command to another escalation handler of the multiple escalation handlers, the other escalation sender module having an escalation severity that is higher than that of the escalation sender module.

Example 8: The integrated circuit of any of the preceding examples, wherein: at least one escalation handler of the multiple escalation handlers is configured, responsive to receiving an escalate command from the alert handler, to implement the at least one security countermeasure; and the at least one security countermeasure comprises: erasing stored data; disconnecting a suspect peripheral device of the multiple peripheral devices from at least one interconnect; collapsing a power domain that includes the suspect peripheral device of the multiple peripheral devices; resetting at least a portion of the integrated circuit; or transitioning at least part of the integrated circuit to an invalid life cycle state.

Example 9: The integrated circuit of any of the preceding examples, wherein the alert handler further comprises: a ping monitor coupled to the multiple alert receiver modules and the controller, the ping monitor configured to: instruct the multiple alert receiver modules to transmit one or more ping requests to the multiple peripheral devices; and notify the controller of an alert ping failure.

Example 10: The integrated circuit of any of the preceding examples, wherein the ping monitor is configured to instruct the multiple alert receiver modules to transmit the one or more ping requests to the multiple peripheral devices based on a randomized time duration.

Example 11: The integrated circuit of any of the preceding examples, wherein: the alert handler further comprises at least one accumulation unit coupled to the controller and at least one escalation timer of the multiple escalation timers; the at least one accumulation unit configured to accumulate a count indicative of a quantity of alerts received from a peripheral device of the multiple peripheral devices; and the controller is configured to escalate the alerts based on the count and responsive to the peripheral device.

Example 12: The integrated circuit of any of the preceding examples, wherein: each peripheral device of the multiple peripheral devices includes at least one alert sender module of multiple alert sender modules; the integrated circuit further comprises multiple signaling pathways, each respective signaling pathway coupled between a respective alert receiver module of the multiple alert receiver modules and a respective alert sender module of the multiple alert sender modules; and each signaling pathway of the multiple signaling pathways comprises at least one differential path.

Example 13: The integrated circuit of any of the preceding examples, wherein: the alert handler further comprises integrity failure circuitry coupled to the controller and the multiple alert receiver modules; and the integrity failure circuitry is configured to generate an alert integrity failure signal responsive to detection of an integrity failure of a differential path of a signaling pathway of the multiple signaling pathways.

Example 14: The integrated circuit of any of the preceding examples, wherein the integrated circuit comprises at least one of: a system-on-a-chip (SoC); or a root-of-trust (RoT) chip.

Example 15: A method for alert handling, the method comprising: monitoring multiple peripheral devices with multiple alert receiver modules; receiving a triggered alert from an alert receiver module of the multiple alert receiver modules based on a peripheral device of the multiple peripheral devices; classifying the triggered alert into an alert classification of multiple alert classifications based on at least one of the alert receiver module or the triggered alert; and initiating an escalation timer of multiple escalation timers based on the alert classification, each respective escalation timer corresponding to a respective escalation severity of multiple escalation severities.

Example 16: The method of example 15, further comprising: adapting an alert handling path that progresses through at least a portion of the multiple escalation timers and at least one escalation sender module based at least partially on an identity of the peripheral device.

Example 17: The method of example 15 or 16, further comprising: transmitting a ping request from the alert receiver module to an alert sender module of the peripheral device; and responsive to failing to receive a ping response from the alert sender module, triggering an alert ping failure signal that initiates another escalation timer of the multiple escalation timers.

Example 18: The method of any one of examples 15 to 17, further comprising: accumulating a quantity of triggered alerts received from the alert receiver module, the alert receiver module coupled to the peripheral device; comparing the quantity of triggered alerts to an alert quantity threshold; and based on the comparing, instructing an escalation sender module to transmit an escalate command to an escalation handler of multiple escalation handlers.

Example 19: An integrated circuit comprising: multiple escalation handlers, each escalation handler configured to implement at least one security countermeasure; and an alert handler comprising: multiple escalation sender modules, each escalation sender module coupled to an escalation handler of the multiple escalation handlers; multiple escalation timers, each respective escalation timer corresponding to a respective escalation severity of multiple escalation seventies, each escalation timer coupled to at least one escalation sender module of the multiple escalation sender modules; and a controller coupled to the multiple escalation timers, the controller configured to initiate an escalation timer of the multiple escalation timers responsive to a triggered alert, the alert handler, responsive to expiration of the initiated escalation timer and based on the triggered alert, configured to selectively: initiate another escalation timer of the multiple escalation timers; or transmit an escalate command from an escalation sender module of the multiple escalation sender modules to an escalation handler of the multiple escalation handlers.

Example 20: The integrated circuit of example 19, wherein: the alert handler comprises at least one register coupled to the controller; and selecting between the initiation of the other escalation timer or the transmission of the escalate command is programmable by software using the at least one register.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Although implementations for alert handling have been described in language specific to certain features and/or methods, the subject of the appended claims is not necessarily limited to the specific features or methods described. Rather, the specific features and methods are disclosed as example implementations for alert handling.

What is claimed is:

1. An integrated circuit comprising:
multiple peripheral devices;
an alert handler comprising:
multiple alert receiver modules, each alert receiver module coupled to a peripheral device of the multiple peripheral devices;
multiple escalation timers, each respective escalation timer corresponding to a respective escalation severity of multiple escalation severities;
a controller coupled to the multiple alert receiver modules and the multiple escalation timers, the controller configured to:
classify a triggered alert received from an alert receiver module of the multiple alert receiver modules into an alert classification of multiple alert classifications based on at least one of the alert receiver module or the triggered alert; and
initiate an escalation timer of the multiple escalation timers based on the alert classification; and
multiple escalation sender modules coupled to the multiple escalation timers; and
multiple escalation handlers, each escalation handler configured to implement at least one security countermeasure,
each escalation handler of the multiple escalation handlers coupled to an escalation sender module of the multiple escalation sender modules,
at least one escalation handler of the multiple escalation handlers configured, responsive to receiving an escalate command from the alert handler, to implement the at least one security countermeasure, and
the at least one security countermeasure comprising:
erasing stored data;
disconnecting a suspect peripheral device of the multiple peripheral devices from at least one interconnect;
collapsing a power domain that includes the suspect peripheral device of the multiple peripheral devices;
resetting at least a portion of the integrated circuit; or
transitioning at least part of the integrated circuit to an invalid life cycle state.

2. The integrated circuit of claim 1, further comprising:
an interconnect; and
a processor coupled to the alert handler via the interconnect,
wherein the controller of the alert handler is configured to:
generate an interrupt based on the triggered alert;
issue the interrupt to the processor;
await expiration of the escalation timer; and
responsive to failing to receive from the processor a response to the interrupt, escalate the triggered alert beyond the escalation timer.

3. The integrated circuit of claim 2, wherein the controller of the alert handler is configured to escalate the triggered alert beyond the escalation timer by at least one of:
issuing another interrupt to the processor, the other interrupt corresponding to a higher interrupt level than that of the interrupt;
initiating another escalation timer of the multiple escalation timers, the other escalation timer corresponding to a higher escalation severity of the multiple escalation severities than that of the escalation timer; or
instructing an escalation sender module of the multiple escalation sender modules to send an escalate command to an escalation handler of the multiple escalation handlers.

4. The integrated circuit of claim 1, wherein the alert handler is configured, responsive to expiration of the escalation timer, to selectively escalate the triggered alert by at least one of:
stepping to a next escalation timer of the multiple escalation timers along a hierarchy of increasing escalation severity; or
skipping the next escalation timer along the hierarchy of increasing escalation severity to another escalation timer of the multiple escalation timers.

5. The integrated circuit of claim 1, wherein:
the alert handler comprises at least one of a switch matrix or a set of multiplexers; and
at least a portion of the multiple escalation timers are selectively coupled to multiple ones of the multiple escalation sender modules via the switch matrix or the set of multiplexers.

6. The integrated circuit of claim 1, wherein the alert handler is configured, responsive to expiration of the escalation timer, to selectively escalate the triggered alert by at least one of:
  instructing an escalation sender module of the multiple escalation sender modules to transmit an escalate command to an escalation handler of the multiple escalation handlers, the escalation sender module having an escalation severity that corresponds to that of the escalation timer; or
  instructing another escalation sender module of the multiple escalation sender modules to send an escalate command to another escalation handler of the multiple escalation handlers, the other escalation sender module having an escalation severity that is higher than that of the escalation sender module.

7. The integrated circuit of claim 1, wherein the alert handler further comprises:
  a ping monitor coupled to the multiple alert receiver modules and the controller, the ping monitor configured to:
    instruct the multiple alert receiver modules to transmit one or more ping requests to the multiple peripheral devices; and
    notify the controller of an alert ping failure.

8. The integrated circuit of claim 7, wherein the ping monitor is configured to instruct the multiple alert receiver modules to transmit the one or more ping requests to the multiple peripheral devices based on a randomized time duration.

9. The integrated circuit of claim 1, wherein:
  the alert handler further comprises at least one accumulation unit coupled to the controller and at least one escalation timer of the multiple escalation timers;
  the at least one accumulation unit configured to accumulate a count indicative of a quantity of alerts received from a peripheral device of the multiple peripheral devices; and
  the controller is configured to escalate the alerts based on the count and responsive to the peripheral device.

10. An integrated circuit comprising:
  multiple peripheral devices, each peripheral device of the multiple peripheral devices including at least one alert sender module of multiple alert sender modules;
  an alert handler comprising:
    multiple alert receiver modules, each alert receiver module coupled to a peripheral device of the multiple peripheral devices;
    multiple escalation timers, each respective escalation timer corresponding to a respective escalation severity of multiple escalation severities; and
    a controller coupled to the multiple alert receiver modules and the multiple escalation timers, the controller configured to:
      classify a triggered alert received from an alert receiver module of the multiple alert receiver modules into an alert classification of multiple alert classifications based on at least one of the alert receiver module or the triggered alert; and
      initiate an escalation timer of the multiple escalation timers based on the alert classification; and
    multiple signaling pathways, each respective signaling pathway coupled between a respective alert receiver module of the multiple alert receiver modules and a respective alert sender module of the multiple alert sender modules, each signaling pathway of the multiple signaling pathways comprising at least one differential path.

11. The integrated circuit of claim 10, wherein:
  the alert handler further comprises integrity failure circuitry coupled to the controller and the multiple alert receiver modules; and
  the integrity failure circuitry is configured to generate an alert integrity failure signal responsive to detection of an integrity failure of a differential path of a signaling pathway of the multiple signaling pathways.

12. The integrated circuit of claim 1, wherein the integrated circuit comprises at least one of:
  a system-on-a-chip (SoC); or
  a root-of-trust (RoT) chip.

13. The integrated circuit of claim 1, wherein the controller is further configured to:
  adapt an alert handling path that progresses through at least a portion of the multiple escalation timers and at least one escalation sender module of the multiple escalation sender modules based at least partially on an identity of a particular peripheral device of the multiple peripheral devices that triggers a particular alert receiver module of the multiple alert receiver modules.

14. The integrated circuit of claim 13, wherein the controller is further configured to:
  transmit a ping request from the particular alert receiver module to an alert sender module of the particular peripheral device; and
  responsive to failing to receive a ping response from the alert sender module, trigger an alert ping failure signal that initiates another escalation timer of the multiple escalation timers.

15. The integrated circuit of claim 1, wherein the controller is further configured to:
  accumulate a quantity of triggered alerts received from an alert receiver module of the multiple alert receiver modules, the alert receiver module coupled to a peripheral device of the multiple peripheral devices;
  compare the quantity of triggered alerts to an alert quantity threshold; and
  based on the comparison, instruct an escalation sender module of the multiple escalation sender modules to transmit an escalate command to an escalation handler of the multiple escalation handlers.

16. An apparatus comprising:
  multiple escalation handlers, each escalation handler configured to implement at least one security countermeasure;
  an alert handler comprising:
    multiple escalation sender modules, each escalation sender module coupled to an escalation handler of the multiple escalation handlers;
    multiple escalation timers, each respective escalation timer corresponding to a respective escalation severity of multiple escalation severities, each escalation timer coupled to at least one escalation sender module of the multiple escalation sender modules; and
    a controller coupled to the multiple escalation timers, the controller configured to initiate an escalation timer of the multiple escalation timers responsive to a triggered alert,
    the alert handler, responsive to expiration of the initiated escalation timer and based on the triggered alert, configured to selectively:
      initiate another escalation timer of the multiple escalation timers; or transmit an escalate command from an escalation sender module of the multiple escalation sender modules to an escalation handler of the multiple escalation handlers; and multiple signaling pathways, each respective signaling pathway coupled between a respective escalation sender module of the multiple escalation sender modules and a respective escalation handler of the multiple escalation handlers, each signaling pathway of the multiple signaling pathways comprising at least one differential path.

17. The apparatus of claim 16, wherein:

the alert handler comprises at least one register coupled to the controller; and the selection between the initiation of the other escalation timer or the transmission of the escalate command is programmable by software using the at least one register.

18. The integrated circuit of claim 13, wherein the controller is further configured to:

confine the alert handling path to components of the alert handler that correspond to an escalation severity of the multiple escalation severities that is indicated by the alert classification.

19. The integrated circuit of claim 10, wherein a signaling pathway of the multiple signaling pathways comprises:

a first pair of wires configured to propagate an alert indication from the respective alert sender module to the respective alert receiver module; and a second pair of wires configured to propagate an alert acknowledgment signal from the respective alert receiver module to the respective alert sender module.

20. The integrated circuit of claim 19, wherein the signaling pathway of the multiple signaling pathways comprises:

a third pair of wires configured to propagate a ping request from the respective alert receiver module to the respective alert sender module, wherein the first pair of wires is further configured to propagate a ping response from the respective alert sender module to the respective alert receiver module.

* * * * *